(12) United States Patent
Aoyama

(10) Patent No.: US 7,519,352 B2
(45) Date of Patent: Apr. 14, 2009

(54) WIRELESS COMMUNICATION NETWORK AND METHOD FOR BROADCASTING HIGH PRIORITY INFORMATION USING DOWNLINK COMMON CHANNELS

(75) Inventor: Akio Aoyama, Tokyo (JP)

(73) Assignee: NEC Corporation, Tokyo (JP)

(*) Notice: Subject to any disclaimer, the term of this patent is extended or adjusted under 35 U.S.C. 154(b) by 264 days.

(21) Appl. No.: 11/475,597

(22) Filed: Jun. 27, 2006

(65) Prior Publication Data
US 2006/0293043 A1 Dec. 28, 2006

(30) Foreign Application Priority Data
Jun. 27, 2005 (JP) .................. 2005-186466

(51) Int. Cl.
*H04M 11/04* (2006.01)
(52) U.S. Cl. .............. 455/404.1; 455/521; 455/25; 455/63.4; 455/522
(58) Field of Classification Search ............ 455/452.2, 455/404.1, 521, 25, 63.4
See application file for complete search history.

(56) References Cited

U.S. PATENT DOCUMENTS

| | | | | |
|---|---|---|---|---|
| 6,161,016 | A * | 12/2000 | Yarwood | 455/445 |
| 6,282,434 | B1 * | 8/2001 | Johannisson et al. | 455/562.1 |
| 6,711,403 | B1 * | 3/2004 | Herrmann et al. | 455/422.1 |
| 7,039,386 | B2 * | 5/2006 | Kolsrud | 455/404.1 |
| 7,274,946 | B2 * | 9/2007 | Struhsaker | 455/521 |
| 2002/0111199 | A1 * | 8/2002 | Yano et al. | 455/574 |
| 2003/0064739 | A1 * | 4/2003 | Lindskog et al. | 455/504 |
| 2004/0229629 | A1 * | 11/2004 | Yi et al. | 455/452.2 |
| 2004/0235421 | A1 * | 11/2004 | Matsuoka et al. | 455/63.4 |
| 2006/0121911 | A1 * | 6/2006 | Zhang et al. | 455/452.2 |
| 2007/0177551 | A1 * | 8/2007 | Joham et al. | 370/332 |

FOREIGN PATENT DOCUMENTS

| | | |
|---|---|---|
| JP | 10-013336 | 1/1998 |
| JP | 10-041875 | 2/1998 |
| JP | 2001-197551 | 7/2001 |
| JP | 2003-318861 | 11/2003 |
| JP | 2004-208153 | 7/2004 |
| JP | 2004-215075 | 7/2004 |
| JP | 2004-229220 | 8/2004 |

* cited by examiner

*Primary Examiner*—Nick Corsaro
*Assistant Examiner*—Vladimir Magloire
(74) *Attorney, Agent, or Firm*—Scully, Scott, Murphy & Presser P.C.

(57) ABSTRACT

A wireless communication network can reliably deliver high priority broadcast information from base stations to mobile terminals located deep in building and those located in scarcely populated areas that are remote from the base stations. Each of the base stations of the wireless communication network comprises a broadcast information input unit for receiving high priority broadcast information and a transmission power changing unit for changing the transmission power of the downlink common channel when high priority broadcast information is input to it. As broadcast information is input, the transmission power changing unit changes the transmission power of the downlink common channel so as to boost the effective radiation power used by the downlink common channel of the base station at places in the coverage of the base station that are subjected to a propagation loss. The effective radiation power to the mobile terminals located at places in the coverage of the base station that are subjected to propagation loss is boosted to raise the reception level of the mobile terminals located at such places.

22 Claims, 22 Drawing Sheets

FIG.2

| ORDINARY TRANS-MISSION POWER | TRANSMISSION POWER Va AFTER CHANGE |
|---|---|
| 30dBm | NOT LESS THAN 33 dBm |

| AMOUNT OF HIGH PRIORITY BROADCAST INFORMATION | DURATION Tb OF CHANGE |
|---|---|
| LESS THAN 10 KB | 3 SEC. |
| 10 KB – 20 KB | 4 SEC. |
| 20 KB – 30 KB | 5 SEC. |
| 30 KB – 40 KB | 6 SEC. |
| NOT LESS THAN 40 KB | 7 SEC. |

Ta2

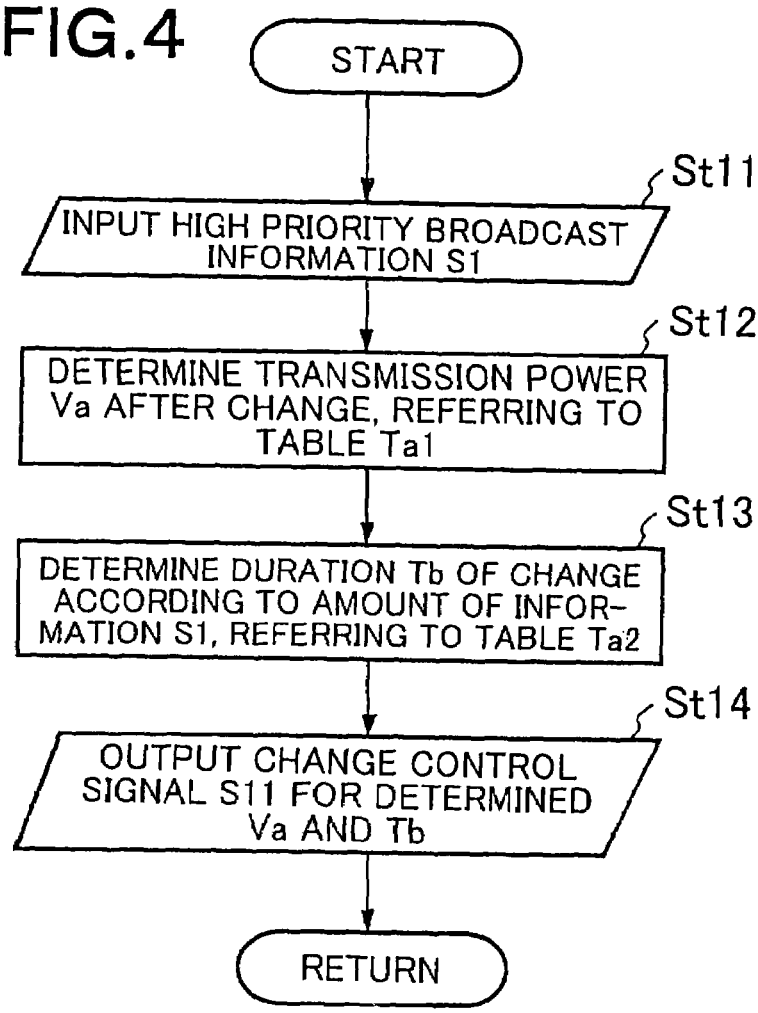
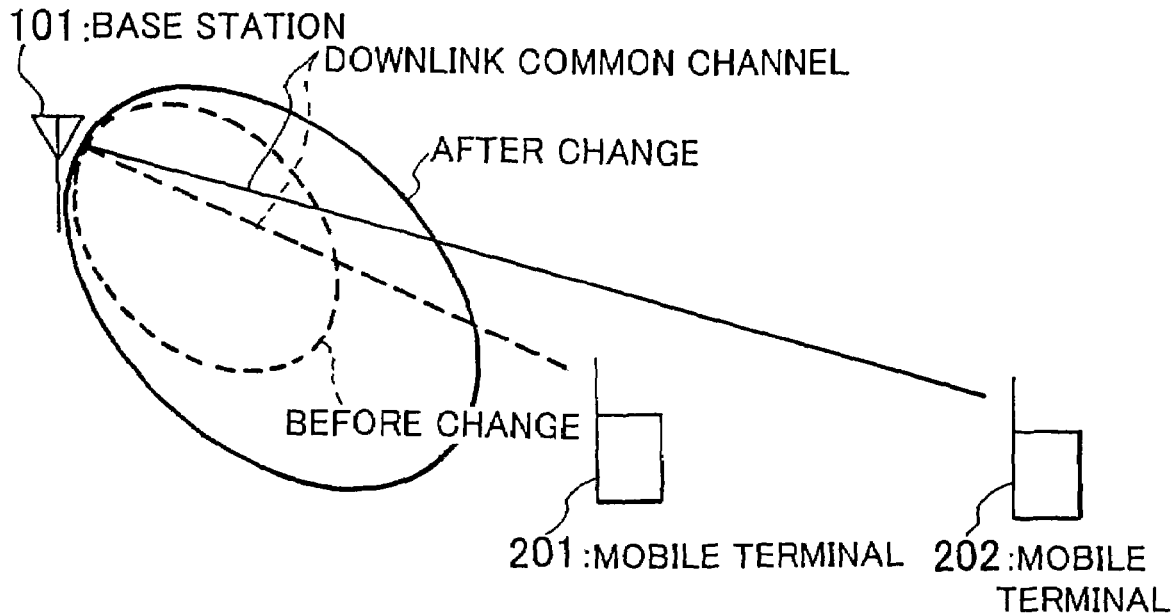

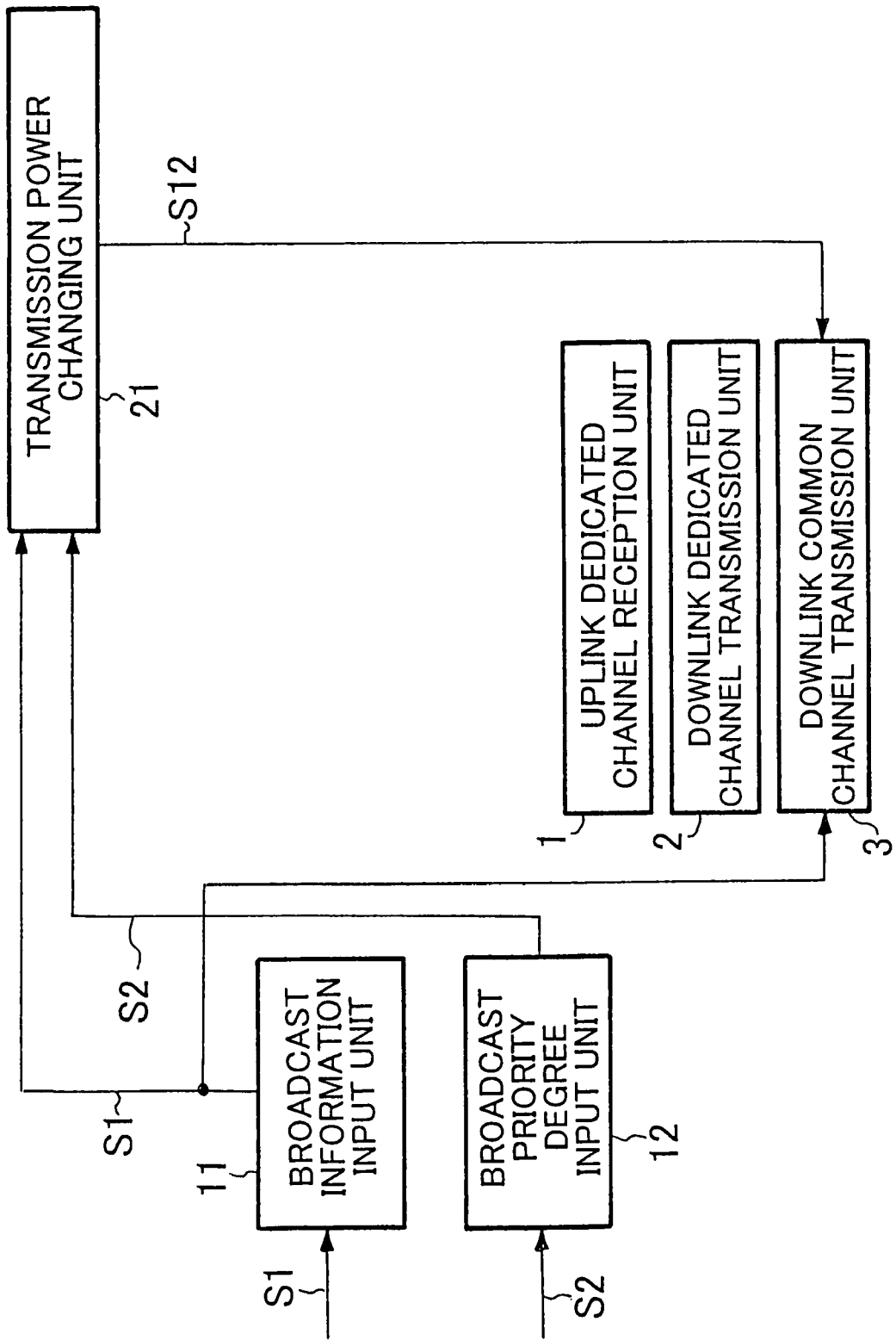

| LEVEL OF BROADCAST PRIORITY DEGREE | TRANSMISSION POWER Vb AFTER CHANGE (ORDINARY TRANSMISSION POWER: 30 dBm) | DURATION Tc OF CHANGE OF TRANS- MISSION POWER |
|---|---|---|
| 0 (ORDINARY) | — | — |
| 1 (ADVERTISEMENT) | 33 dBm | Tb × 2 |
| 2 (EMERGENCY) | 36 dBm | Tb × 4 |
| 3 (EMERGENCY) | 39 dBm | Tb × 8 |

FIG.13

| LEVEL OF BROADCAST PRIORITY DEGREE | TILT ANGLE θa AFTER CHANGE (ORDINARY TILT ANGLE: TYPICALLY 5 DEG.) | DURATION Td OF CHANGE OF TRANSMISSION POWER |
|---|---|---|
| 0 (ORDINARY) | — | — |
| 1 (ADVERTISEMENT) | 3 DEG. | Tb × 2 |
| 2 (EMERGENCY) | 2 DEG. | Tb × 4 |
| 3 (EMERGENCY) | 1 DEG. | Tb × 8 |

| LEVEL OF BROADCAST PRIORITY DEGREE | GAIN Ga OF ADAPTIVE ANTENNA (GAIN OF ORDINARY ANTENNA: 10 dBm) | DURATION Te OF REPLACEMENT BY ADAPTIVE ANTENNA |
|---|---|---|
| 0 (ORDINARY) | — | — |
| 1 (ADVERTISEMENT) | 13 dBm | Tb × 2 |
| 2 (EMERGENCY) | 16 dBm | Tb × 4 |
| 3 (EMERGENCY) | 20 dBm | Tb × 8 |

Ta5

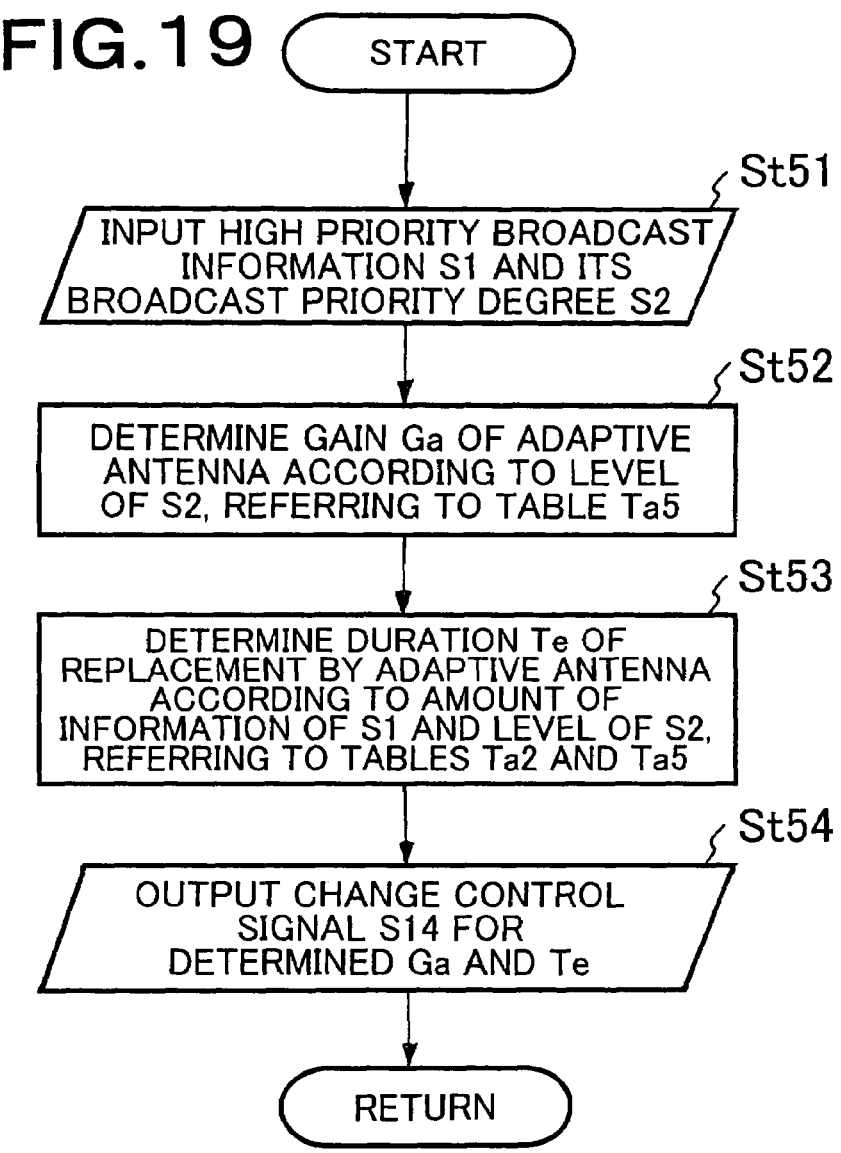
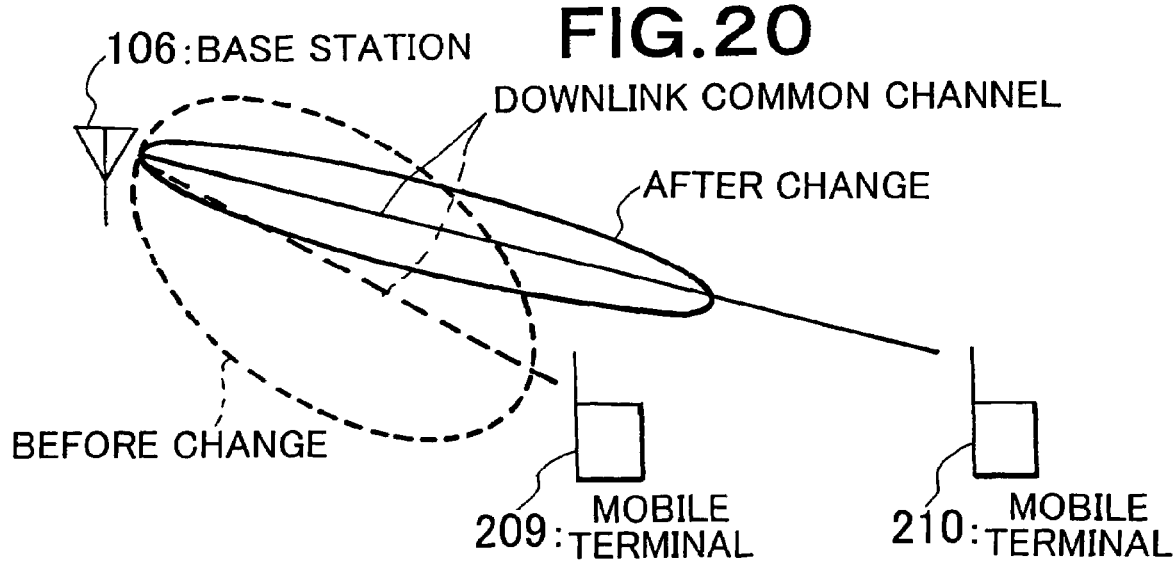

FIG.22

| LEVEL OF BROADCAST PRIORITY DEGREE | TRANSMISSION FREQUENCY Fa AFTER CHANGE (ORDINARY TRANSMISSION FREQUENCY: 2 GHz BAND) | DURATION Tf OF CHANGE OF TRANSMISSION FREQUENCY |
|---|---|---|
| 0 (ORDINARY) | — | — |
| 1 (ADVERTISEMENT) | 2 GHz BAND | Tb × 2 |
| 2 (EMERGENCY) | 1.7 GHz BAND | Tb × 4 |
| 3 (EMERGENCY) | 800 GHz BAND | Tb × 8 |

Ta6

WIRELESS COMMUNICATION NETWORK AND METHOD FOR BROADCASTING HIGH PRIORITY INFORMATION USING DOWNLINK COMMON CHANNELS

BACKGROUND OF THE INVENTION

1. Field of the Invention

This invention relates to a wireless communication network in a cellular system formed by a plurality of base stations, which broadcasts information using downlink common channels, transmits information using downlink dedicated channels and receives information using uplink dedicated channels. More particularly, the invention relates to a wireless communication network for broadcasting high priority information using downlink common channels.

2. Description of the Related Art

A prior technique relevant to transmission of high priority information in the wireless communication network has been disclosed by JP-A-10-41875, which describes a communication system and a portable telephone terminal having an function of automatic emergency communication. This terminal changes its transmission method when used for emergency communication so as to transmit high priority information using uplink channels.

Another prior technique has been disclosed by JP-A-10-13336, which describes a public business digital mobile communication system. This system can broadcast high priority information without interrupting individual communications of mobile stations by using idle communication channels or compulsory communication channels in order to transmit and broadcast emergency information, or high priority information.

Of the above-described two techniques, the former is directed to change the transmission method via uplinks, whereas the latter is directed to broadcast by using idle communication channels or compulsory communication channels.

As shown in FIG. 22, each of the base stations of known wireless communication networks having a broadcasting function comprises an uplink dedicated channel reception unit 1, a downlink dedicated channel reception unit 2 and a downlink common channel transmission unit 3.

Normally, a wireless communication system is designed in such a way that the cell radius of an uplink and that of a downlink are substantially equal to each other and base stations are provided for the system in order to realize bidirectional communication via the uplink and the downlink.

Particularly, in W-CDMA (wide band-code division multiple access) type wireless communication systems, the cell radius, or the coverage area, and the wireless communication system capacity qualitatively show a relationship of tradeoff. For this reason, the wireless communication system is designed and regulated so as to make the wireless communication system capacity as large as possible for both the uplinks and the downlinks in order to realize the coverage area that is presumably necessary and sufficient.

Additionally, wireless communication systems have been made to operate as communication systems and, at the same time, as broadcasting systems as in the case of MBMS (multimedia broadcast & multicast systems) in recent years. The functional feature of broadcasting system is realized by using downlinks as common channels for broadcasting information. No problem arises to wireless communication systems that are designed and regulated to operate as broadcasting systems for broadcasting information to the coverage so long as the information to be broadcast has an ordinary level of priority.

However, as the first problem of the prior art, it is not possible to convey the broadcast information quickly and reliably to mobile terminals out of the designed coverage of such a wireless communication system if there occurs a situation where high priority information needs to be broadcast because the system is primarily designed as wireless communication system. Particularly, a place deep in a large building that gives rise to a large propagation loss can often be out of the coverage of the uplink because of the upper limit of the transmission power of the mobile terminal and hence it is also out of the coverage of the downlink. Then, there arises a problem that no broadcast information is conveyed to mobile terminals at places located deep in buildings. Additionally, many scarcely populated areas are designed to be out of the coverage of wireless communication systems because of the profitability of the wireless communication system in addition to a large propagation loss of such areas. Thus, there also arises a problem that no broadcast information is conveyed to mobile terminals of scarcely populated areas.

Conceivable circumstances where high priority broadcast information is transmitted include those where the meteorological agency requests wireless communication systems to broadcast an emergency alarm for exercising vigilance over an earthquake and a tsunami and urging evacuation of a specific area. Other such circumstances may be those where one or more than one responsible administrative ministries and/or agencies request wireless communication systems to broadcast an emergency alarm for exercising vigilance over a terror, a missile attack, an attack of biological weapons or toxic gas, a risk of widespread infection of a highly infectious disease, an accident of a nuclear power plant or the like and urging evacuation. However, high priority broadcast information is not limited to such emergency alarms. High priority broadcast information may be advertisement for a discount sale in a limited time zone that is requested to broadcast by a retailer.

High priority broadcast information may be requested to be or have to be conveyed reliably to mobile terminals at places deep in buildings and scarcely populated areas. However, no technique has been available to date to wireless communication systems for reliably broadcasting such high priority information.

As the second problem of the prior art, it is not possible to estimate the amount of the monetary loss that arises to a wireless communication system when it is forced to broadcast high priority information. Then, it is not possible for the wireless communication system to provide a reliable basis for the charge to be made to the party that requested to broadcast high priority information.

SUMMARY OF THE INVENTION

In view of the above identified two problems of the prior art, it is therefore an object of the present invention to reliably deliver high priority broadcast information from base stations to mobile terminals located deep in building and those located in scarcely populated areas that are remote from the base stations in a wireless communication network adapted to broadcast information using downlink common channels in addition to transmissions using downlink dedicated channels and receptions using uplink dedicated channels in a cellular system having a plurality of base stations.

Another object of the present invention is to make it possible to estimate the loss that is incurred by a transmission of high priority broadcast information.

In order to achieve the above object, as one aspect of the present invention, there is provided a wireless communication network having a plurality of base stations for forming a cellular system for wireless communications with a plurality of mobile terminals via uplinks and downlinks, the wireless communication network comprising: a downlink dedicated channel transmission unit configured to individually transmit communication data from the plurality of base stations to the plurality of mobile terminals using downlink dedicated channels of the cellular system; an uplink dedicated channel reception unit configured to individually receive communication data from the plurality of mobile terminals using uplink dedicated channels of the cellular system; a downlink common channel transmission unit configured to transmit broadcast information from the plurality of base stations to the plurality of mobile terminals using the downlink common channels of the cellular system; a broadcast information input unit configured to input high priority broadcast information as the broadcast information; and a transmission method changing unit configured to change the transmission method of the downlink common channels used by the downlink common channel transmission unit so as to make effective radiation power of the downlink common channels of the base stations large at places in the coverage of each of the base stations subjected to propagation loss when the high priority broadcast information is input.

In the present invention, the transmission method changing unit may have a unit configured to set the duration of the change of the transmission method based on an amount of information of the high priority broadcast information.

In the present invention, the wireless communication network may further comprise: a broadcast priority degree input unit configured to input a degree of priority of the broadcast information, wherein the transmission method changing unit has a unit configured to change the transmission method of the downlink common channel according to the level of the degree of priority of the broadcast information.

In the present invention, the wireless communication network may further comprise: a computation unit configured to compute a ratio of the number of acknowledgements for the deliveries of the broadcast information from the mobile terminals received by the uplink dedicated channels relative to the number of mobile terminals expected to be found in the coverage, wherein the transmission method changing unit has a unit configured to change the transmission method of the downlink common channel according to the ratio computed by the computation unit.

In the present invention, the transmission method changing unit may have a unit configured to change a transmission power of each of the base stations as the transmission method. The transmission method changing unit may have a unit configured to change a tilt angle of a transmission antenna each of the base stations as the transmission method. The transmission method changing unit may have a unit configured to replace a transmission antenna with an adaptive antenna of each of the base stations as the transmission method. The transmission method changing unit may have a unit configured to change a transmission frequency of each of the base stations as the transmission method.

In the present invention, the wireless communication network may further comprise: a call suspension detection unit configured to detect the call suspensions arising in the wireless communication network as a result of the change of transmission method of the downlink common channel changed by the transmission method changing unit and counting the number of the call suspensions; and an amount of loss computation unit configured to compute an amount of loss on the basis of the number of call suspensions arising in the wireless communication network.

In the present invention, the wireless communication network may further comprise: a unit configured to compute a predicted broadcast information delivery ratio showing a ratio of the mobile terminals in the coverage expected to complete the reception of the broadcast delivery according to the change of the transmission method of the downlink common channel and a predicted amount of loss according to the number of call suspensions and the number of call losses predicted to take place in the wireless communication network as a result of the change of the transmission method.

As another aspect of the present invention, there is provided a wireless communication network design tool to be used by the above wireless communication network, the tool comprising: a unit configured to compute a predicted broadcast information delivery ratio showing a ratio of the mobile terminals in the coverage expected to complete the reception of the broadcast delivery according to the change of the transmission method of the downlink common channel and a predicted amount of loss according to the number of call suspensions and the number of call losses predicted to take place in the wireless communication network as a result of the change of the transmission method.

Still, as another aspect of the present invention is provided a method of broadcasting high priority information of wireless communication network having a plurality of base stations for forming a cellular system for wireless communications with a plurality of mobile terminals via uplinks and downlinks, said wireless communication network comprising: a downlink dedicated channel transmission unit configured to individually transmit communication data from the plurality of base stations to the plurality of mobile terminals using downlink dedicated channels of the cellular system; an uplink dedicated channel reception unit configured to individually receive communication data from the plurality of mobile terminals using uplink dedicated channels of the cellular system; a downlink common channel transmission unit configured to transmit broadcast information from the plurality of base stations to the plurality of mobile terminals using the downlink common channels of the cellular system, the method comprising: a step of inputting high priority broadcast information as the broadcast information; and a step of changing the transmission method of the downlink common channels used by the downlink common channel transmission unit so as to make effective radiation power of the downlink common channels of the base stations large at places in the coverage of each of the base stations subjected to propagation loss when the high priority broadcast information is input.

Thus, according to the present invention, a wireless communication network adapted to transmit broadcast information using downlink common channels in addition to transmissions of downlink dedicated channels and receptions of uplink dedicated channels can reliably deliver high priority broadcast information to mobile terminals located deep in building and those located in scarcely populated areas that are remote from base stations. Additionally, it is possible to estimate the loss that is incurred by a transmission of high priority broadcast information.

BRIEF DESCRIPTION OF THE DRAWINGS

FIG. 2 is a schematic illustration of a table defining the transmission power after a change, shown as an example;

FIG. 3 is a schematic illustration of a table defining the durations of a power shift, shown as an example;

FIG. 4 is a flowchart of the operation of the transmission power changing unit of FIG. 1;

FIG. 5 is a schematic illustration of the effective radiation power when the transmission power of a base station is changed;

FIG. 6 is a schematic block diagram of a base station of the second embodiment of wireless communication network, according to the present invention, illustrating the configuration thereof;

FIG. 7 is a schematic illustration of a table defining the transmission powers after a change and the durations of a power shift, shown as an example;

FIG. 13 is a schematic illustration of a table defining the tilt angles after a change and the durations of a power shift, shown as an example;

FIG. 18 is a schematic illustration of a table defining the gains of an adaptive antenna and the durations of a change made in the adaptive antenna, shown as an example;

FIG. 19 is a flowchart of the operation of the transmission antenna changing unit of FIG. 17;

FIG. 20 is a schematic illustration of the effective radiation power of a base station when the antenna of the base station is changed to an adaptive antenna;

FIG. 22 is a schematic illustration of a table defining the transmission frequencies after a change and the durations of a frequency change, shown as an example;

DETAILED DESCRIPTION OF THE PREFERRED EMBODIMENTS

Now, the present invention will be described in greater detail below by referring to the accompanying drawings that illustrate preferred embodiments of the invention.

The embodiments of wireless communication system are typically formed by using a W-CDMA type cellular system and hence have a plurality of base stations constituting a cellular system adapted to communicate with a plurality of mobile terminals (user terminals) found in the coverage of the system via uplinks and downlinks. In the following, only a single base station of the cellular system will be described for each embodiment.

First Embodiment

Figure 1:
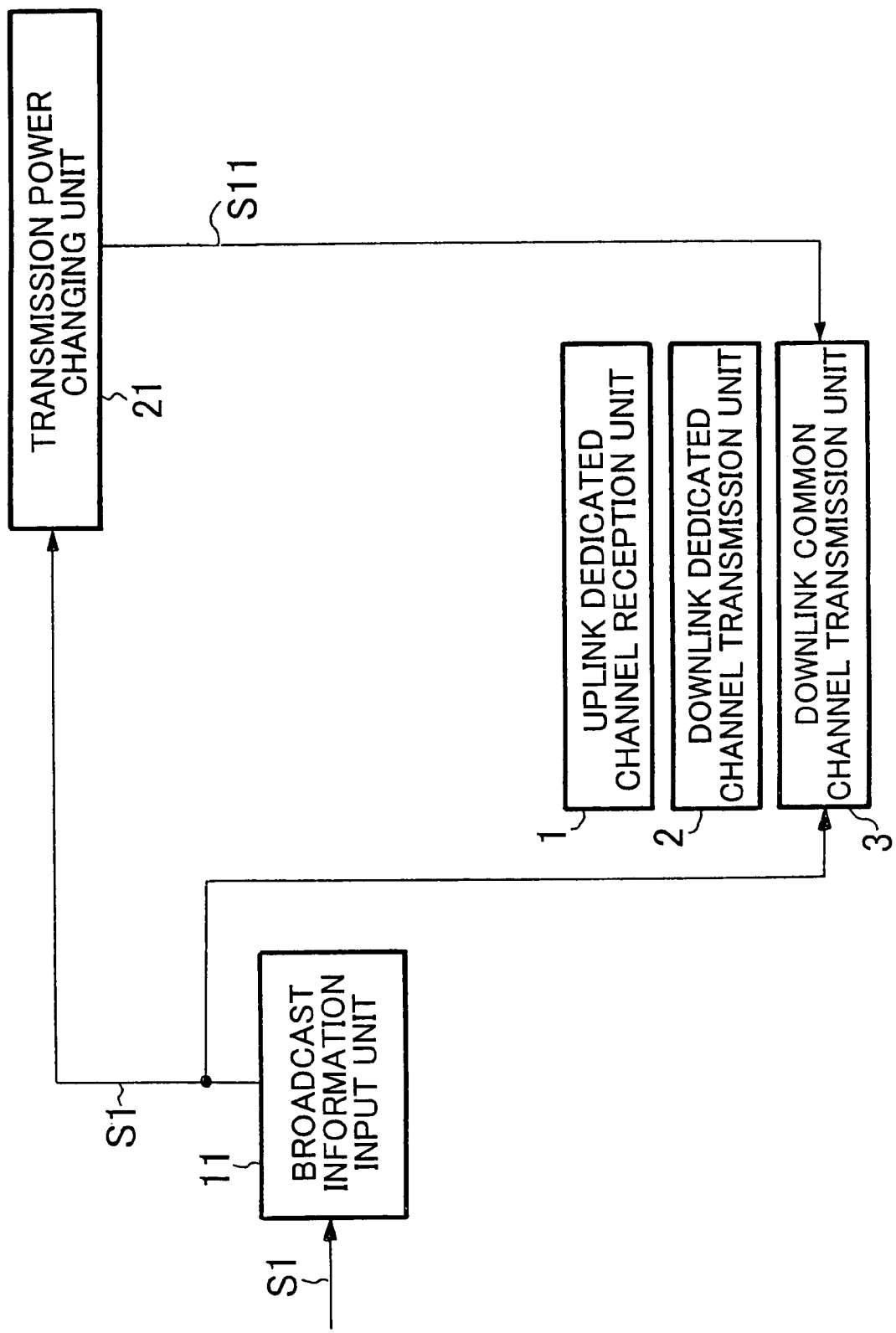
FIG. 1 is a schematic block diagram of a base station of the first embodiment of wireless communication network according to the present invention, illustrating the configuration thereof.

FIG. 1 is a schematic block diagram of a base station of the first embodiment of wireless communication system according to the present invention, illustrating the internal configuration of a base station.

The base station of the cellular system of this embodiment of wireless communication system comprises: an uplink dedicated channel reception unit 1, a downlink dedicated channel transmission unit 2, a downlink common channel transmission unit 3, a unit 11 (to be referred to as "broadcast information input unit" hereinafter), and a unit 21 (to be referred to as "transmission power changing unit" hereinafter). The uplink dedicated channel reception unit 1 receives individual signals of each mobile terminal transmitted from the mobile terminal via the uplink using a W-CDMA type uplink dedicated channel. The downlink dedicated channel transmission unit 2 transmits individual signals of each mobile terminal via the downlink using a W-CDMA type downlink dedicated channel. The downlink common channel transmission unit 3 transmits (broadcasts) broadcast information to all mobile terminals via the downlink using a W-CDMA type downlink common channel. The broadcast information input 11 inputs high priority broadcast information. The transmission power changing 21 changes the transmission power of the downlink common channel according to the input high priority broadcast information.

Of the above components, the uplink dedicated channel reception unit 1, the downlink dedicated channel transmission unit 2 and the downlink common channel transmission unit 3 comprise, for example, an antenna, an amplifier and a modem in the base station.

The uplink dedicated channel reception unit 1 receives the information signal transmitted individually from each mobile terminal in the coverage of the uplink via the antenna. The unit 1 amplifies the signal level of the received information signal by the amplifier and then decodes the amplified reception signal into information transmitted from the mobile terminal by the modem.

The downlink dedicated channel transmission unit 2 prepares a transmission signal by modulating the information to be individually transmitted to each mobile terminal in the coverage of the downlink by the modem. The unit 2 amplifies the signal level of the transmission signal by the amplifier and then transmits the amplified transmission signal to the mobile terminal via the antenna.

The downlink common channel transmission unit 3 prepares a transmission signal by modulating the information including the broadcast information to be commonly transmitted to all the mobile terminals in the coverage of the downlink by the modem. The unit 3 amplifies the signal level of the transmission signal by the amplifier and then transmits the amplified transmission signal to all the mobile terminals via the antenna.

The broadcast information input unit 11 is typically formed by software to be executed by the CPU in the control apparatus connected to the base station through a network and displays, on a display unit of the control apparatus, a screen (predefined screen) for receiving an input of high priority broadcast information to the operator through the operation of the software. Then, as high priority broadcast information S1 is input as a result of an operation of the operator on the displayed screen, the broadcast information input unit 11 supplies the broadcast information S1 to the downlink common channel transmission unit 3 and the transmission power changing unit 21.

The high priority broadcast information S1 may be an emergency alarm for exercising vigilance over an earthquake and a tsunami and urging evacuation of a specific area as requested to broadcast by the meteorological agency, an emergency alarm for exercising vigilance over a terror, a missile attack, an attack of biological weapons or toxic gas, a risk of widespread infection of a highly infectious disease, an accident of a nuclear power plant or the like and urging evacuation as requested to broadcast by one or more than one responsible administrative ministries and or agencies or an advertisement for a discount sale in a limited time zone as requested to broadcast by a retailer.

The transmission power changing unit 21 decides the method of changing the transmission power according to the supplied broadcast information S1. Methods that can be used for changing the transmission power for this embodiment include those of specifying the transmission power level after the change and those of specifying the duration of the shift of the transmission power level. Methods of specifying the transmission power level after the change include a method of selecting a predetermined high transmission power level after the change when broadcast information is input. Methods of specifying the duration of the shift of the transmission power level include a method of selecting a predetermined time period that is estimated to be sufficient for completing the transmission of the broadcast information for the duration of the shift of the transmission power level and a method of selecting a time period that is proportional to the amount of the broadcast information S1.

The transmission power changing unit 21 is typically formed by using the CPU and memories (ROM/RAM) in the control apparatus of the base station in order to perform control operations necessary to decide the method of changing the transmission power and may be realized as the CPU executes a control program (which will be described in greater detail hereinafter) stored in the ROM. The specific operation of the control program may be such that the transmission power level of the downlink common channel after the change is determined according to the supplied broadcast information S1, referring to a table (which will be described in greater detail hereinafter) showing the correspondence between the amount of the high priority broadcast information S1 and a control value for the amount of information. Additionally, the transmission power changing unit 21 changes the transmission power of the downlink common channel by changing the gain of the amplifier.

Now, the operation of the control program to be executed by the transmission power changing unit 21 for this embodiment will be described by referring to FIGS. 2 through 4.

FIG. 2 is a schematic illustration of a table Ta1 defining the transmission power after a change when high priority broadcast information S1 is input, shown as an example. In the example of FIG. 2, the ordinary transmission power is 30 dBm, whereas the transmission power Va after a change is defined to be not less than 33 dBm.

FIG. 3 is a schematic illustration of a table Ta2 defining the durations Tb of a power shift, from which one is to be selected in proportion to the amount of the high priority broadcast information S1, shown as an example. In the example of FIG. 3, the Tb is 3 seconds when the amount (KB) of information S1 is less than 10 KB, 4 seconds when the amount of information is not less than 10 KB and less than 20 KB, 5 seconds when the amount of information is not less than 20 KB and less than 30 KB, 6 seconds when the amount of information is not less than 30 KB and less than 40 KB and 7 seconds when the amount of information is not less than 40 KB.

FIG. 4 is a summarized flowchart of the operation of the control program of this embodiment.

Referring to FIG. 4, the transmission power changing unit 21 firstly inputs high priority broadcast information S1 from the broadcast information input unit 11 (Step St11). It is assumed here that the amount of information of the broadcast information S1 is 25 KB.

Then, the transmission power changing unit 21 decides the transmission power Va after a change, referring to the table Ta1 shown in FIG. 2 (Step St12). In the example of FIG. 2, the transmission power Va after a change is decided to be not less than 33 dBm when the ordinary (before the change) transmission power is 30 dBm.

Thereafter, the transmission power changing unit 21 decides the duration Tb of the shift of the transmission power according to the amount of information of the broadcast information S1, referring to the table Ta2 shown in FIG. 3 (Step St13). In the example of FIG. 3, the duration Tb of the shift is decided to be 5 seconds when the amount of information of the broadcast information S1 is 25 KB.

Then, the transmission power changing unit 21 supplies a change control signal S11 of the decided control values for the post-change transmission power Va (not less than 33 dBm) and the duration Tb of the shift (5 seconds) to the downlink common channel transmission unit 3 (Step St14). Note that the control values are the respective differences from the ordinary values. However, not a control operation using the differences but a switching control operation may be used for the purpose of the present invention.

As a result, the downlink common channel transmission unit 3 changes the transmission power of the downlink common channel according to the change control signal S11 of the control values for controlling the method of changing the transmission power that is supplied to it. At this time, the transmission power is assigned to the downlink common channel, which is given priority relative to the downlink dedicated channels. When assigning the transmission power to the downlink common channel, giving priority to it, the dedicated channels are forcibly disconnected. Thus, the transmission power that becomes available as a result of forcibly disconnecting the downlink dedicated channels is assigned to the downlink common channel. Then, for the duration Tb during which the transmission power of the downlink common channel is shifted, the supplied broadcast information S1 is repeatedly transmitted by the common channel signal that all the mobile terminals in the coverage of the downlink receive.

Meanwhile, the uplink dedicated channel reception unit 1 receives the dedicated channel signals transmitted from the mobile terminals in the coverage of the uplink.

Then, the downlink dedicated channel transmission unit 2 transmits the dedicated channel signal that one or more than one specific mobile terminals in the coverage of the downlink receive by means of the base station transmission power left after the change in transmission power of the downlink common channel that has already been made. Note, however, if no base station transmission power is left, the downlink dedicated channel transmission unit 2 does not transmit the dedicated channel signal of the downlink.

FIG. 5 is a schematic illustration of the effective radiation power along a vertical plane of the downlink common channel when the transmission power of a base station is changed. Note that the effective radiation power is illustrated schematically by taking the antenna pattern, the antenna gain and the transmission power into consideration.

While the downlink common channel is transmitted from the base station 101 with the effective radiation power indicated by a dotted line in FIG. 5 before the change of transmission power, it is transmitted with the effective radiation power indicated by a solid line in FIG. 5 after the change of transmission power to a predetermined high transmission power level because of the increase in the transmission power. As a result, if the mobile terminal 201 can receive the downlink common channel but the mobile terminal 202 cannot receive it before the change of transmission power, the reception power level of the mobile terminal 202 is increased so that it can receive the downlink common channel after the change of transmission power.

The reception power level of the mobile terminal 202 is increased because the effective radiation power is increased in the angle of the direction from the base station 101 to the mobile terminal 202 although the propagation loss between the base station 101 and the mobile terminal 202 is not changed. Thus, the mobile terminal 202 that cannot receive the broadcast information because it cannot receive the downlink common channel before the change of transmission power comes to be able to receive the broadcast information after the change of transmission power. The above description applies not only to the mobile terminal 202 but also to any mobile terminal that is located at a place that shows a large propagation loss.

Therefore, this embodiment provides an advantage that it can reliably deliver the broadcast information to a mobile terminal located deep in a large building that shows a large propagation loss and a mobile terminal located at a place far away from the base station, which may be in a scarcely populated area out of the coverage of the base station and also shows a large propagation loss.

Second Embodiment

FIG. 6 is a schematic block diagram of a base station of the second embodiment of wireless communication system according to the present invention, illustrating the internal configuration thereof.

As shown in FIG. 6, this embodiment is realized by adding a unit 12 for inputting the degree of priority of the broadcast information S2 (to be referred to as "broadcast priority degree input unit" hereinafter) to each base station having the above-described internal configuration of the first embodiment of wireless communication system.

Like the above-described broadcast information input unit 11, the broadcast priority degree input unit 12 is typically realized by a piece of software stored in the control apparatus connected to the base station by way of a network, which software is adapted to display, on the display unit of the control apparatus, a screen (predefined screen) for receiving an input of the degree of priority of the broadcast information S2 of the broadcast information S1 having a high degree of priority by the operator. As the degree of priority S2 of the broadcast information is input by the operator in the displayed screen, the broadcast priority degree input unit 12 supplies the degree of priority S2 of the broadcast information to the transmission power changing unit 21.

The transmission power changing unit 21 decides the method of changing the transmission power according to the broadcast information S1 and the degree of priority S2 of the broadcast information supplied to it. As in the case of the first embodiment, methods that can be used for changing the transmission power for this embodiment include those of specifying the transmission power level after the change and those of specifying the duration of the shift of the transmission power level. Methods of specifying the transmission power level after the change include a method of deciding a high transmission power value that is proportional to the level of the degree of priority of the broadcast information as the post-change transmission power value in addition to those described above for the first embodiment. The duration of the shift of transmission power may be decided by selecting a time period for the change of transmission power that is proportional to the level of the degree of priority of the broadcast information.

For the operation of deciding the method of changing the transmission power, the transmission power changing unit 21 is typically formed by using the CPU and memories (ROM/RAM) in the control apparatus of the base station in order to perform operations necessary to decide the method of changing the transmission power and may be realized as the CPU executes a control program (which will be described in greater detail hereinafter) stored in the ROM. The specific operation of the control program may be such that the transmission power level of the downlink common channel after the change is determined according to the supplied broadcast information, referring to a table (which will be described in greater detail hereinafter) showing the correspondence between the amount of the high priority broadcast information S1 and the level of the degree of priority S2 of the broadcast information and a control value for them. Additionally, the transmission power changing unit 21 changes the transmission power of the downlink common channel by changing the gain of the amplifier.

Now, the operation of the control program to be executed by the transmission power changing unit 21 for this embodiment will be described by referring to FIGS. 7 and 8.

FIG. 7 is a schematic illustration of a table Ta3 for specifying the transmission power Vb and the duration Tc of the shift of the transmission power after a change when high priority broadcast information S1 and the degree of priority S2 of the broadcast information are input, shown as an example. In the example of FIG. 7, different values are defined for the transmission power Vb after a change and the duration Tc of a shift of the transmission power to correspond to levels 0 through 3 (0: ordinary broadcast information, 1: advertisement information, 2: emergency information, 3: emergency information) of the degree of priority S2. The defined values of the transmission power Vb after a change include level 0: not specified, level 1: 33 dBm, level 2: 36 dBm, level 3: 39 dBm and those of the durations Tc of the shift of the transmission power include level 0: not specified, level 1: Tb×2, level 2: Tb×4, level 3; Tb×8. In FIG. 7, Tb corresponds to the duration Tb of a power shift in the above-described Table Ta2 in FIG. 3.

Figure 8:
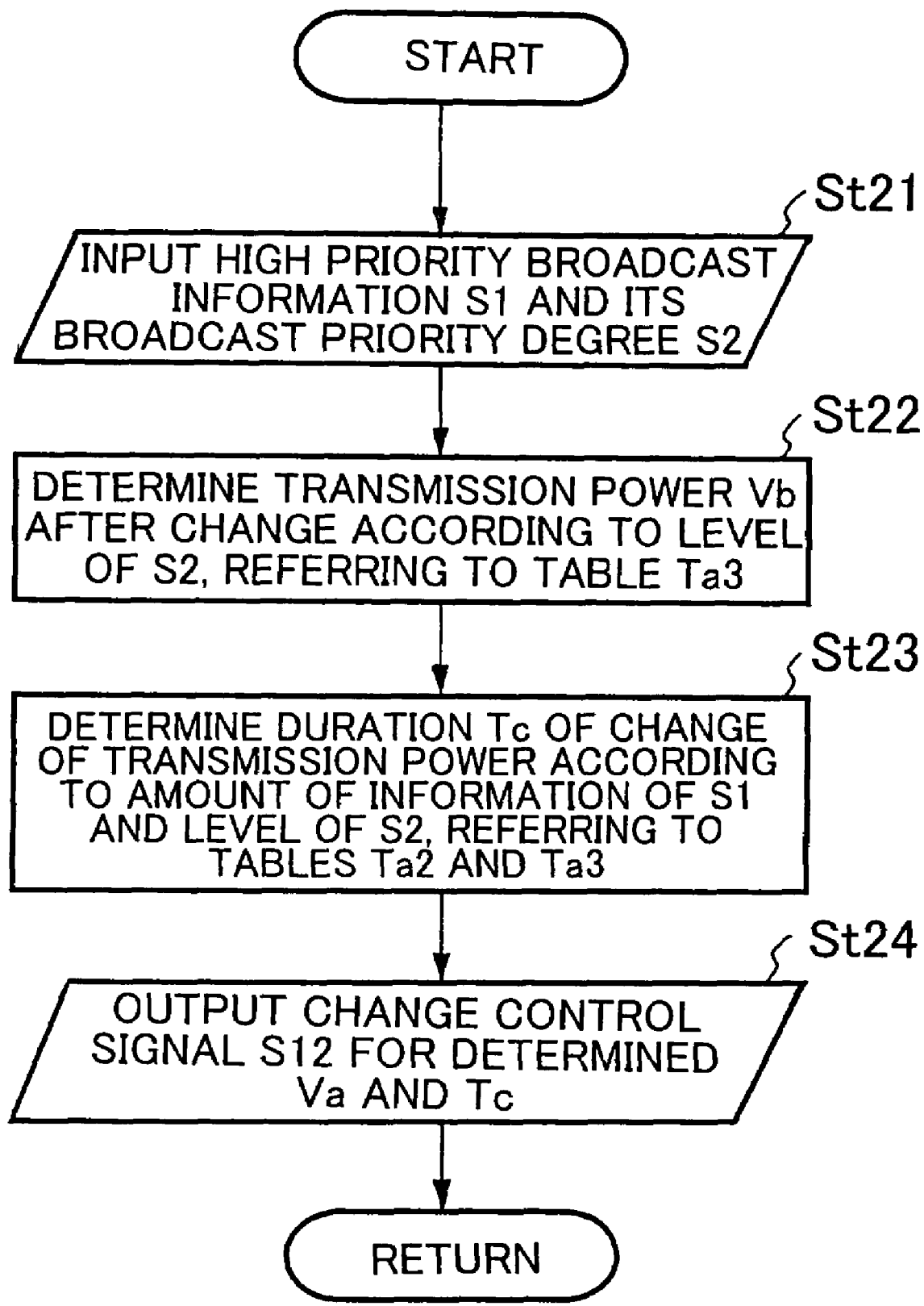
FIG. 8 is a flowchart of the operation of the transmission power changing unit of FIG. 6.

FIG. 8 is a summarized flowchart of the operation of the control program of this embodiment.

Referring to FIG. 8, the transmission power changing unit 21 firstly inputs high priority broadcast information S1 and the degree of priority S2 of the broadcast information respectively from the broadcast information input unit 11 and the broadcast priority degree input unit 12 (Step St21). It is assumed here that level of the broadcast information S1 is 2 (emergency information) and the amount of information of the broadcast information S1 is 35 KB.

Then, the transmission power changing unit 21 decides the transmission power Vb according to the level of the degree of priority S2 of the broadcast information, referring to the table Ta3 shown in FIG. 8 (Step St22). In the example of FIG. 8, the transmission power Vb after a change is decided to be 36 dBm when the level of the degree of priority S2 of the broadcast information is 2.

Thereafter, the transmission power changing unit 21 decides the duration Tc of the shift according to the amount of information of the broadcast information S1 and the degree of the priority S2 of the broadcast information, referring to the table Ta3 shown in FIG. 8 (Step St23). In the example of FIGS. 3 and 8, the duration Tc of the shift is decided to be Tb×4=6×4=24 seconds when the amount of information of the broadcast information S1 is 35 KB and the degree of priority S2 of the broadcast information is 2.

Then, the transmission power changing unit 21 supplies a change control signal S12 of the decided control values for the post-change transmission power Vb (36 dBm) and the duration Tc of the shift (24 seconds) to the downlink common channel transmission unit 3 (Step St24). Note that the control values are the respective differences from the ordinary values. However, not a control operation using the differences but a switching control operation may be used for the purpose of the present invention.

As a result, the downlink common channel transmission unit 3 transmits the broadcast information S1 by way of the downlink common channel according to the change control signal S12 of the control values for controlling the method of changing the transmission power that is supplied to it as in the case of the first embodiment.

Thus, with this embodiment, it is so arranged that the transmission power of the downlink common channel is changed to transmit the broadcast information S1 by a high transmission power that is proportional to the level of the degree of priority of the broadcast information and the change is held for a time period that is also proportional to the level of the degree of priority of the broadcast information. Therefore, this embodiment provides an advantage that it can reliably deliver the broadcast information to a mobile terminal located deep in a large building that shows a large propagation loss and a mobile terminal located at a place far away from the base station, which may be in a scarcely populated area out of the coverage of the base station and also shows a large propagation loss.

Third Embodiment

Figure 9:
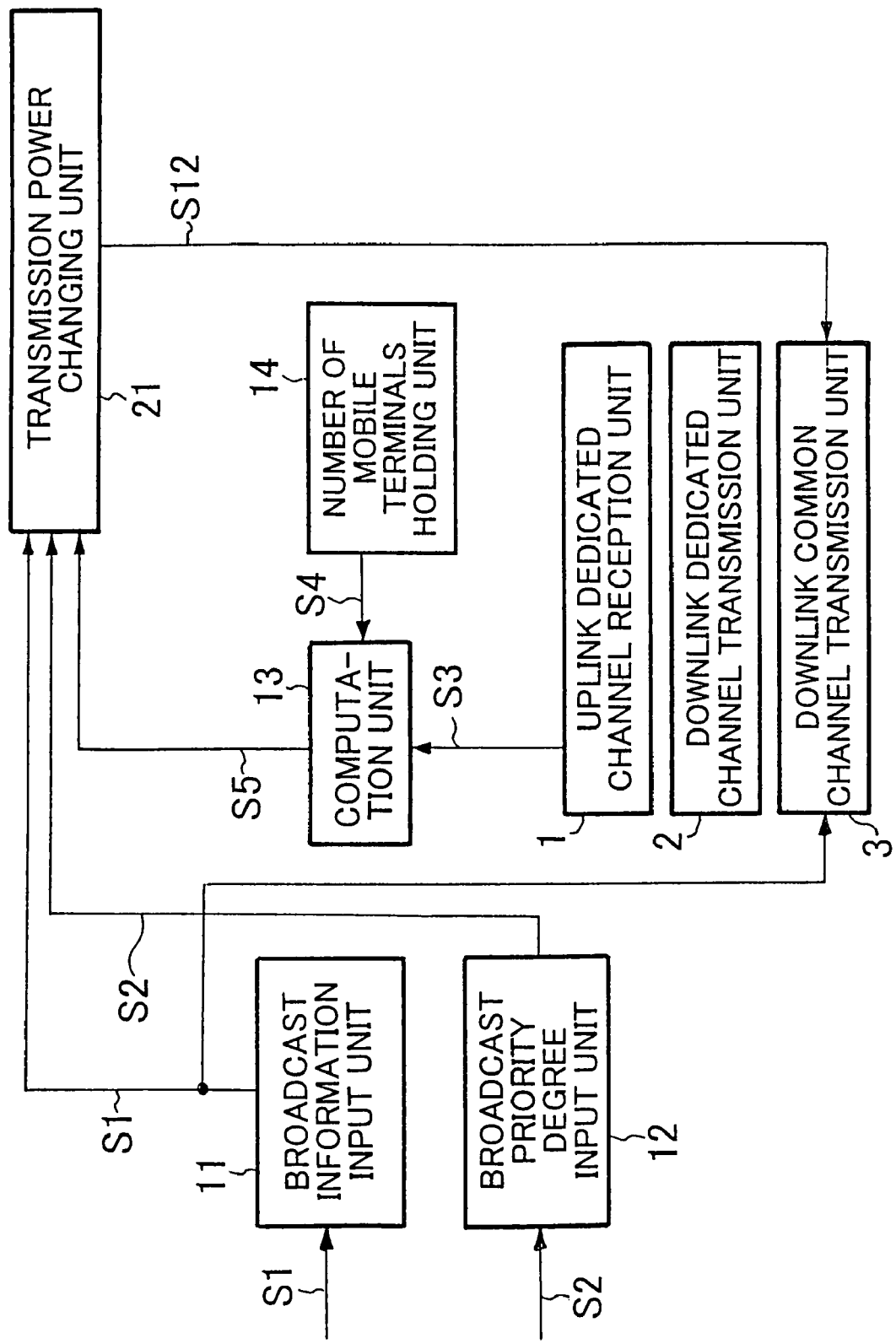
FIG. 9 is a schematic block diagram of a base station of the third embodiment of wireless communication network according to the present invention, illustrating the configuration thereof.

FIG. 9 is a schematic block diagram of a base station of the third embodiment of wireless communication system according to the present invention, illustrating the internal configuration thereof.

As shown in FIG. 9, this embodiment is realized by adding a unit 13 for computing the ratio of the number of acknowledgements relative to the number of broadcast deliveries (to be referred to as "computation unit" hereinafter) and a unit 14 for holding the number of mobile terminals that is expected to be found in the coverage in advance (to be referred to as "number of mobile terminals holding unit" hereinafter) to each base station having the above-described internal configuration of the second embodiment of wireless communication system.

Upon receiving the signals of acknowledgements of broadcast deliveries transmitted from mobile terminals by way of respective uplink dedicated channels to acknowledge the receptions of broadcast information S1, the uplink dedicated channel reception unit 1 count the number of acknowledgements S3 of the broadcast deliveries and supplies the counted number of acknowledgements S3 to the computation unit 13.

Then, the computation unit 13 computes the ratio S5 of the number of mobile terminals S4 that is expected to be found in the coverage in advance as held by the number of mobile terminals holding unit 14 relative to the number of acknowledgements S3 of broadcast deliveries as expressed by a fractional number where the denominator is the number of mobile terminals S4 and the numerator is the number of responses S3 acknowledging the broadcast deliveries that is supplied from the uplink dedicated channel reception unit 1. Then, the computation unit 13 supplies the computed ratio S5 of the acknowledgements of the broadcast deliveries to the transmission power changing unit 21.

The transmission power changing unit 21 decides the method of changing the transmission power of the downlink common channel according to the broadcast information S1 supplied to it, the degree of priority S2 of the broadcast information also supplied to it and the ratio S5 of the acknowledgements of the broadcast deliveries.

As in the case of the second embodiment, methods that can be used for changing the transmission power for this embodiment include those of specifying the transmission power level after the change and those of specifying the duration of the shift of the transmission power level. Additionally, methods that can be used for changing the transmission power for this embodiment also include those of specifying the time of ending the shift of transmission power. Methods of specifying the transmission power level after the change and those of specifying the duration of the shift of the transmission power level that can be used for this embodiment are same as those of the second embodiment.

Methods of specifying the time of ending the shift of the transmission power that can be used for this embodiment include those of specifying the ending time according to the ratio of the acknowledgements of the broadcast deliveries.

Figure 10:
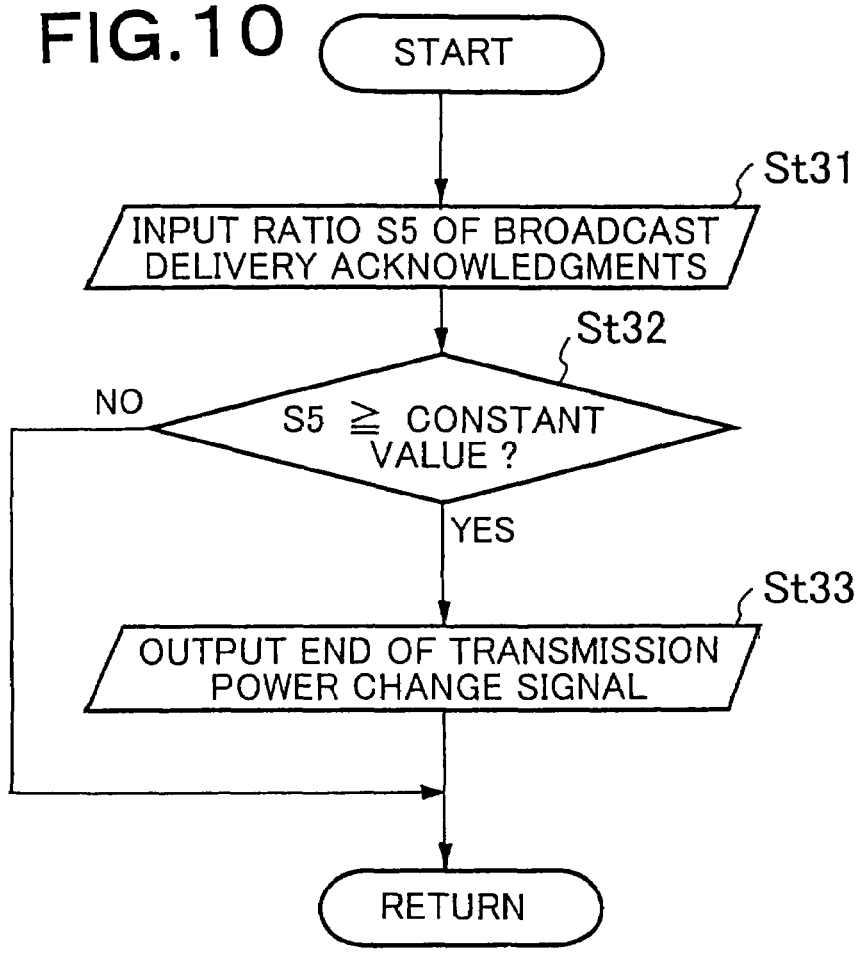
FIG. 10 is a flowchart of the operation of the transmission power changing unit of FIG. 9.

With such a method, for example, the shift of the transmission power is continued until the ratio S5 of the acknowledgements of the broadcast deliveries rises to a level not less than a predetermined number and ended instantaneously when the ratio gets to the level not less than a predetermined number. FIG. 10 schematically illustrates the operation of the transmission power changing unit 21 when this method is used.

Referring to FIG. 10, as the ratio S5 of the acknowledgements of the broadcast deliveries is input from the computation unit 13 (Step St31), the transmission power changing unit 21 determines if the input ratio S5 is not less than a predetermined value or not (Step St32). If, as a result, it is determined that the ratio S5 is less than the predetermined value (Step St32: NO), the transmission power changing unit 21 returns to Step St31 to repeat the above sequence. If, on the other hand, it is determined that the ratio S5 is not less than the predetermined value (Step St32:YES), it supplies a shift ending signal for ending the shift of the transmission power to the downlink common channel transmission unit 3 (Step St33). As a result, the downlink common channel transmission unit 3 ends the shift of the transmission power by means of a change control signal S12, whish is described earlier.

Figure 11:
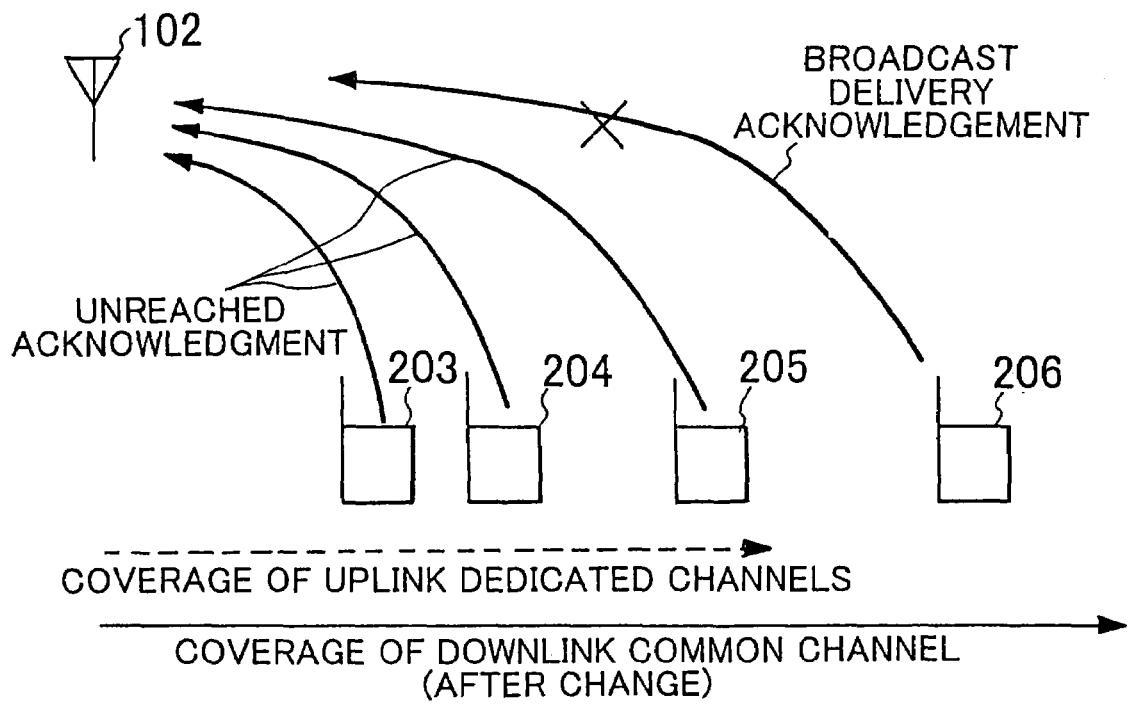
FIG. 11 is a schematic illustration of the transmission of a broadcast delivery acknowledgment by mobile terminals by way of respective uplink dedicated channels.

FIG. 11 is a schematic illustration of the transmission of a broadcast delivery acknowledgment signal by mobile terminals 203, 204, 205, 206 by way of respective uplink dedicated channels to the base station 102 as viewed from a lateral side. In the example of FIG. 11, the mobile terminals 203, 204, 205 are found in the coverage of the uplink dedicated channels but the mobile terminals 203, 204, 205, 206 are found in the coverage of the downlink common channel after a change of transmission power.

Referring to FIG. 11, upon receiving the broadcast information from the base station 102, the four mobile terminals 203, 204, 205 and 206 transmit a signal acknowledging the reception of the broadcast information to the base station 102. Of the signals of the mobile terminals acknowledging the reception of the broadcast information, those of the mobile terminals 203, 204, 205 that are located close to the base station 102 get to the base station 102 whereas the acknowledgement signal of the mobile terminal 206 that is located remote from the base station 102 does not get to the base station 102.

Since the probability of delivering broadcast information in the coverage of the uplink dedicated channels is expected to be proportional to the probability of delivering broadcast information in the coverage of the downlink common channel, it may be safe to assume that the probability of delivering broadcast information in the coverage of the downlink common channel is made to be not less than a predetermined level by raising the probability of delivering broadcast information in the coverage of the uplink dedicated channels to a predetermined level or higher. Therefore, the transmission power changing unit 21 determines the time of ending the shift of the transmission power according to the ratio of the number of acknowledgements of the broadcast deliveries by way of the uplink dedicated channels.

Thus, with this embodiment, the shift of the transmission power of the downlink common channel is continued until the ratio of acknowledgement of the broadcast deliveries becomes to a predetermined level or higher. Therefore, this embodiment provides an advantage of raising the probability of delivering broadcast information to a predetermined level or higher, although time of ending the shift of the transmission power is determined only on the basis of the responses from the mobile terminals found in the coverage of the uplink dedicated channels, because the probability of delivering broadcast information in the coverage of the uplink dedicated channels is expected to be proportional to the probability of delivering broadcast information in the coverage of the downlink common channel and hence it may be safe to assume that the probability of delivering broadcast information in the coverage of the downlink common channel is made to be not less than a predetermined level by raising the probability of delivering broadcast information in the coverage of the uplink dedicated channels to a predetermined level or higher.

Additionally, with this embodiment, the shift of the transmission power of the downlink common channel is instantaneously ended when the ratio of acknowledgements of the broadcast deliveries is raised to a predetermined level of higher. In other words, the shift of the transmission power of the downlink common channel is ended under a condition where the probability of delivering broadcast information is expected to have been raised to a predetermined level or higher to avoid a situation of unnecessarily continuing the shift of the transmission power of the downlink common channel. When a shift of the transmission power of the downlink common channel is continued for an unnecessarily long period, the power assigned to the downlink dedicated channels is reduced to give rise to a problem of prolonging a state of disabled communication of the downlink dedicated channels. In other words, this embodiment provides an additional advantage of reducing the time period of a state of disabled communication of the downlink dedicated channels by avoiding a situation of unnecessarily continuing the shift of the transmission power of the downlink common channel.

Fourth Embodiment

Figure 12:
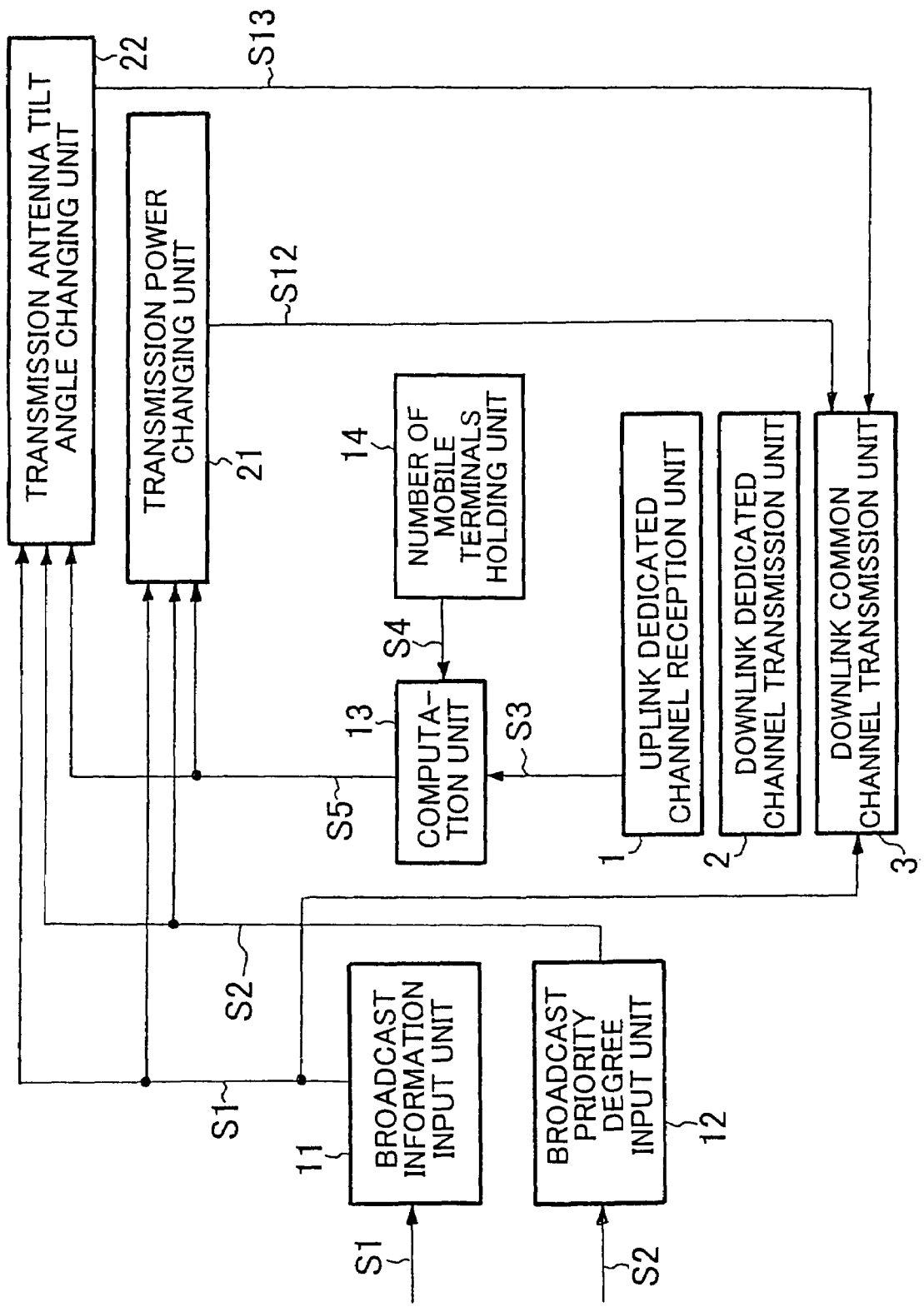
FIG. 12 is a schematic block diagram of a base station of the fourth embodiment of wireless communication network according to the present invention, illustrating the configuration thereof.

FIG. 12 is a schematic block diagram of a base station of the fourth embodiment of wireless communication system according to the present invention, illustrating the internal configuration thereof.

As shown in FIG. 12, this embodiment is realized by adding a unit 22 for changing the tilt angle of the transmission antenna of the downlink common channel (to be referred to as "transmission antenna tilt angle changing unit" hereinafter) to each base station having the above-described internal configuration of the third embodiment of wireless communication system.

As high priority broadcast information S1 is input, the broadcast information input unit 11 subsequently supplies the high priority broadcast information S1 to the transmission antenna tilt angle changing unit 22 in addition to its operation that is same as the operation of its counterpart of the third embodiment described above by referring to FIG. 4.

As the degree of priority of the broadcast information S2 of the high priority broadcast information S1 is input, the broadcast priority degree input unit 12 subsequently supplies the degree of priority S2 of the broadcast information to the transmission antenna tilt angle changing unit 22 in addition to its operation that is same as the operation of its counterpart of the third embodiment.

The computing unit 13 computes the ratio S5 of the acknowledgements of the broadcast deliveries and subsequently supplies the ratio S5 of the acknowledgements of the broadcast deliveries it has computed to the transmission antenna tilt angle changing unit 22 in addition to its operation that is same as the operation of its counterpart of the third embodiment.

The transmission antenna tilt angle changing unit 22 determines the method of changing the tilt angle of the antenna according to the broadcast information S1, the degree of priority S2 of the broadcast information and the ratio S5 of the acknowledgements of the broadcast deliveries supplied to it.

Methods that can be used for changing the tilt angle of the antenna include methods of specifying the tilt angle of the antenna after a change thereof, those of specifying the duration of the shift of the tilt angle of the antenna and those of specifying the time of ending the shift of the tilt angle of the antenna. Methods of specifying the tilt angle of the antenna after a change thereof include a method of selecting a predetermined shallow title angle after a change of the title angle of the antenna when broadcast information is input. A shallow tilt angle refers to that the angle between the direction of the peak of the directional pattern in a vertical plane of the antenna of the base station and a horizontal plane, or the angle of inclination of the antenna, is small. Methods of specifying the tilt angle of the antenna after a change thereof also include a method of determining the tilt angle of the antenna after a change thereof in proportion to the degree of priority of the broadcast information. Methods of specifying the duration of the shift of the tilt angle of the antenna and those of specifying the time of ending the shift of the tilt angle of the antenna that can be used for this embodiment are similar to those of the first through third embodiments. Then, the transmission antenna tilt angle changing unit 22 supplies the determined method of changing the tilt angle of the antenna to the downlink common channel transmission unit 3.

The transmission antenna tilt angle changing unit 22 has a configuration similar and equivalent to that of the transmission power changing unit 21 but the control program thereof determines the control value after the change, referring to a separate table that defines the tilt angles of the antenna (as will be described in greater detail hereinafter). Additionally, the transmission antenna tilt angle changing unit 22 changes the tilt angle of the antenna by changing the phase of the transmission signal to be supplied to the elements of the transmission antenna that is formed by using a plurality of elements arranged in a vertical direction.

The operation of a specific control program to be executed by the transmission antenna tilt angle changing unit 22 will be described below by referring to FIGS. 13 and 14.

FIG. 13 is a table Ta4 for defining the tilt angles θa of the antenna after a change thereof and the durations Td of the shift of the tilt angle when high priority broadcast information S1 and the degree of priority S2 of the broadcast information are input, shown as an example. In the example of FIG. 13, different values are defined for the tilt angle θa and the duration Td of a shift of the tilt angle to correspond to levels 0 through 3 of the degree of priority S2 of the broadcast information (level 0: ordinary broadcast information, level 1: advertisement information, level 2: emergency information, level 3: emergency information). The defined values of the tilt angle θa after a change include level 0: not specified, level 1: 3 degrees, level 2: 2 degrees, level 3: 1 degree while the defined values of the duration Td of the shift of the tilt angle include level 0: not specified, level 1: Tb×2, level 2: Tb×4, level 3: Tb×8. In FIG. 13, Tb corresponds to the duration Tb of a power shift in the above-described Table Ta2 in FIG. 3.

Figure 14:
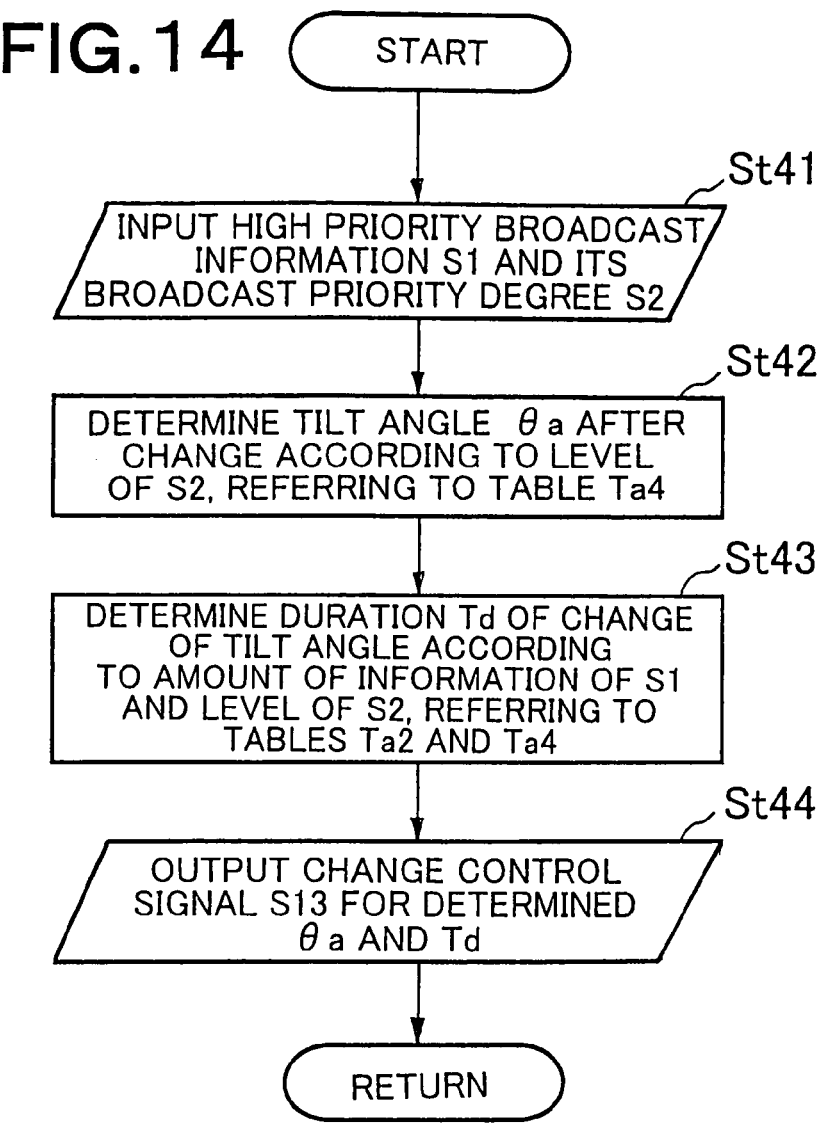
FIG. 14 is a flowchart of the operation of the transmission antenna tilt angle changing unit of FIG. 12.

FIG. 14 is a flowchart of the operation of the control program of the transmission antenna tilt angle changing unit of this embodiment.

Referring to FIG. 14, the transmission antenna tilt angle changing unit 22 firstly inputs high priority broadcast information S1 and the degree of priority S2 of the broadcast information respectively from the broadcast information input unit 11 and the broadcast priority degree input unit 12 (Step St41). It is assumed here that level of the broadcast information S1 is 2 (emergency information) and the amount of information of the broadcast information S1 is 35 KB.

Then, the transmission antenna tilt angle changing unit 22 decides the tilt angle θa of the transmission antenna after a change thereof according to the level of the broadcast priority degree S2, referring to the table Ta4 shown in FIG. 13 (Step St42). In the example of FIG. 13, the tilt angle θa after a change is decided to be 2 degrees when the level of the degree of priority S2 of the broadcast information is 2.

Thereafter, the transmission antenna tilt angle changing unit 22 decides the duration Td of the shift according to the amount of information of the broadcast information S and the level of the degree of priority S2 of the broadcast information, referring to the table Ta4 shown in FIG. 13 (Step St43). In the example of FIGS. 3 and 8, the duration Td of the shift is decided to be Tb×4=6×4=24 seconds when the amount of information of the broadcast information S1 is 35 KB and the level of the degree of priority of the broadcast information is 2.

Then, the transmission antenna tilt angle changing unit 22 supplies a change control signal S13 of the decided control values for the post-change tilt angle θa (2 degrees) and the duration Td of the shift (24 seconds) to the downlink common channel transmission unit 3 (Step St44). Note that the control values are the respective differences from the ordinary values. However, not a control operation using the differences but a switching control operation may be used for the purpose of the present invention.

As a result, the downlink common channel transmission unit 3 changes the tilt angle of the antenna of the downlink common channel according to the change control signal S13 of the control value for controlling the method of changing the tilt angle of the antenna supplied to it. Then, it repeatedly transmits the broadcast information S1 supplied to it for the time period of Td during which the tilt angle of the antenna of the downlink common channel is shifted by means of the common channel signal that all the mobile terminals in the coverage of the downlink receive.

Figure 15:
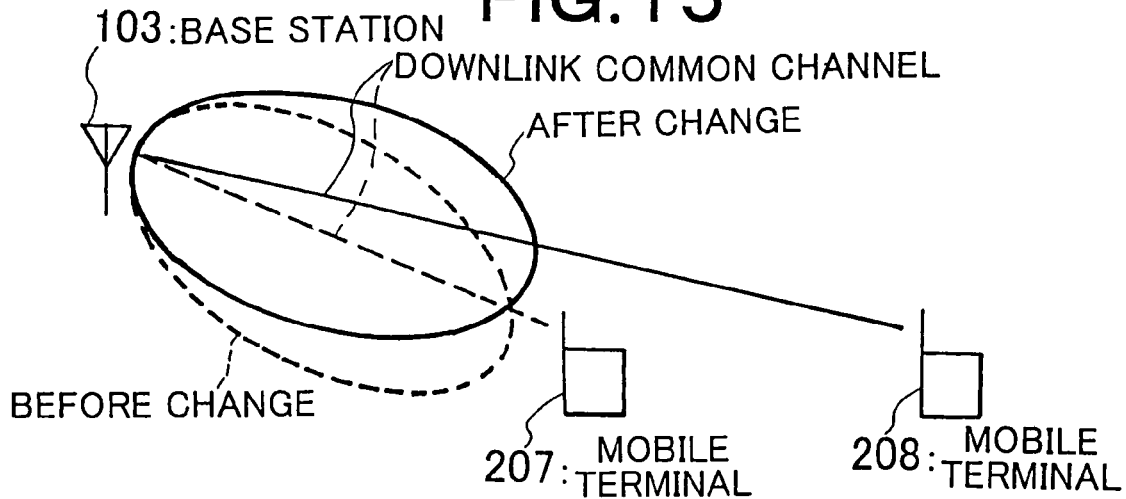
FIG. 15 is a schematic illustration of the effective radiation power of a base station when the tilt angle of the antenna of the base station is changed.

FIG. 15 is a schematic illustration of the effective radiation power of the transmission power of the downlink common channel from the base station 103 when only the tilt angle of the antenna of the base station is changed in this embodiment.

While a downlink common channel is transmitted from the base station 103 with the effective radiation power indicated by a dotted line in FIG. 15 before the change of tilt angle of the antenna, it is transmitted with the effective radiation power indicated by a solid line in FIG. 15 after the change of title angle of the antenna to a predetermined shallow tilt angle. As a result, if the mobile terminal 207 can receive the downlink common channel but the mobile terminal 208 cannot receive it before the change of the tilt angle, the reception power level of the mobile terminal 208 is increased so that it can receive the downlink common channel after the change of tilt angle of the antenna to a predetermined shallow tilt angle.

The reception power level of the mobile terminal 208 is increased because the effective radiation power is increased in the angle of the direction from the base station 103 to the mobile terminal 208 although the propagation loss between the base station 103 and the mobile terminal 208 is not changed. Thus, the mobile terminal 208 that cannot receive the broadcast information because it cannot receive the downlink common channel before the change of the tilt angle of the antenna comes to be able to receive the broadcast information after the change of the tilt angle of the antenna. The above description applies not only to the mobile terminal 208 but also to any mobile terminal that is located at a place remote from the base station that shows a large propagation loss.

Figure 16:
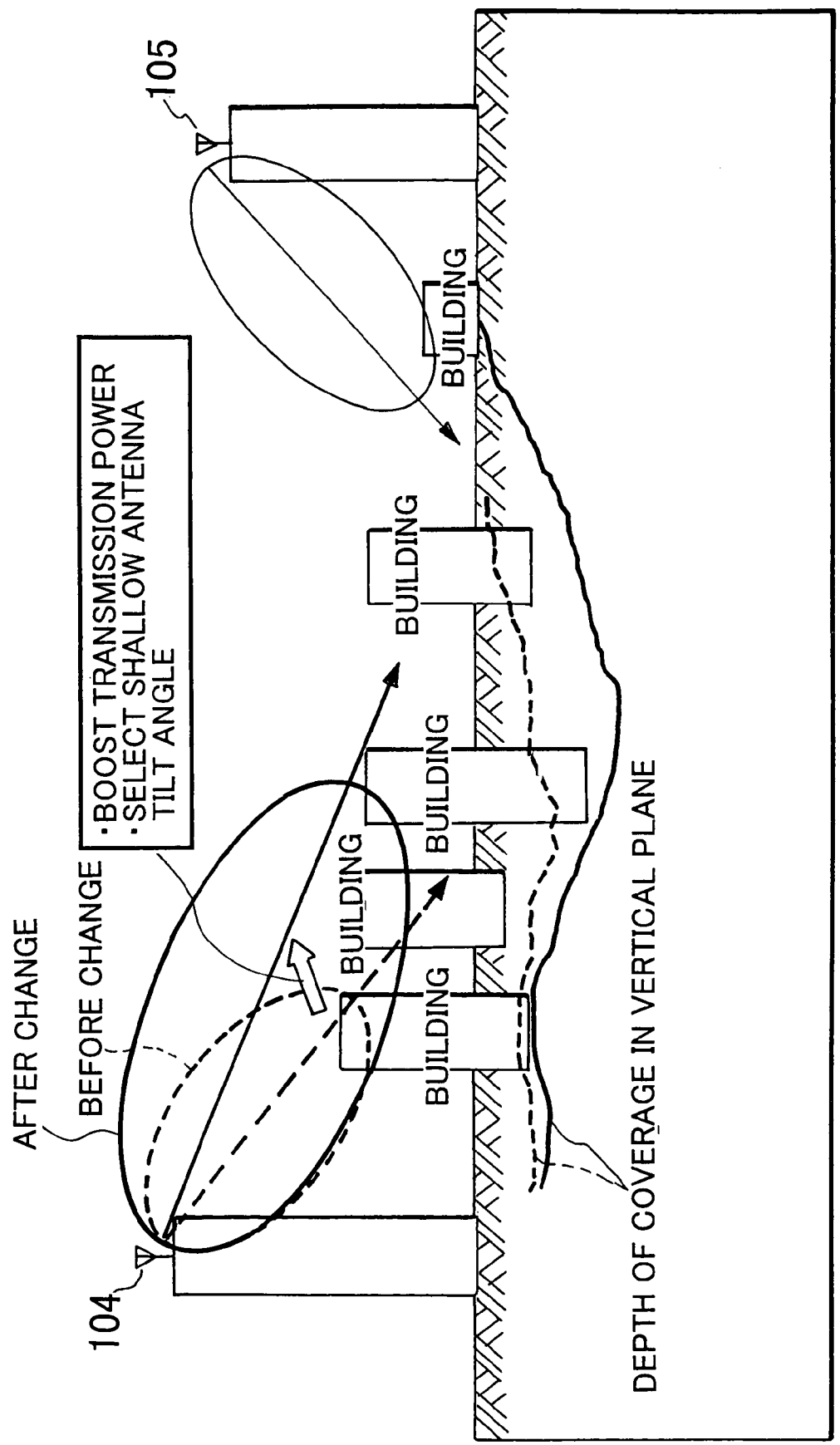
FIG. 16 is a schematic illustration of the effective radiation power and the coverage of a base station when both the transmission power and the antenna tilt angle of the base station are changed.

FIG. 16 is a schematic illustration of the effective radiation power and the coverage of a base station as viewed in a vertical plane of the transmission power of the downlink common channel from the base station when both the transmission power and the antenna tilt angle of the base station are changed.

In FIG. 16, the effective radiation power and the coverage in the vertical plane of the downlink common channel from the base station 104 before a change of the transmission power and that of the tilt angle of the antenna are indicated by a dotted line, whereas those after the changes are indicated by a solid line. In FIG. 16, there are drawn a plurality of buildings having basements. As seen from FIG. 16, as a result of both of the change of the transmission power of the downlink common channel and that of the tilt angle of the antenna, the coverage is expanded and the basement of the building that used to be located on the edge of the coverage comes into the coverage.

Therefore, this embodiment provides an advantage that it can reliably deliver the broadcast information to a mobile terminal located deep in a building remote from the base station that shows a large propagation loss and a mobile terminal located at a place far away from the base station, which may be in a scarcely populated area out of the coverage of the base station and also shows a large propagation loss.

Fifth Embodiment

Figure 17:
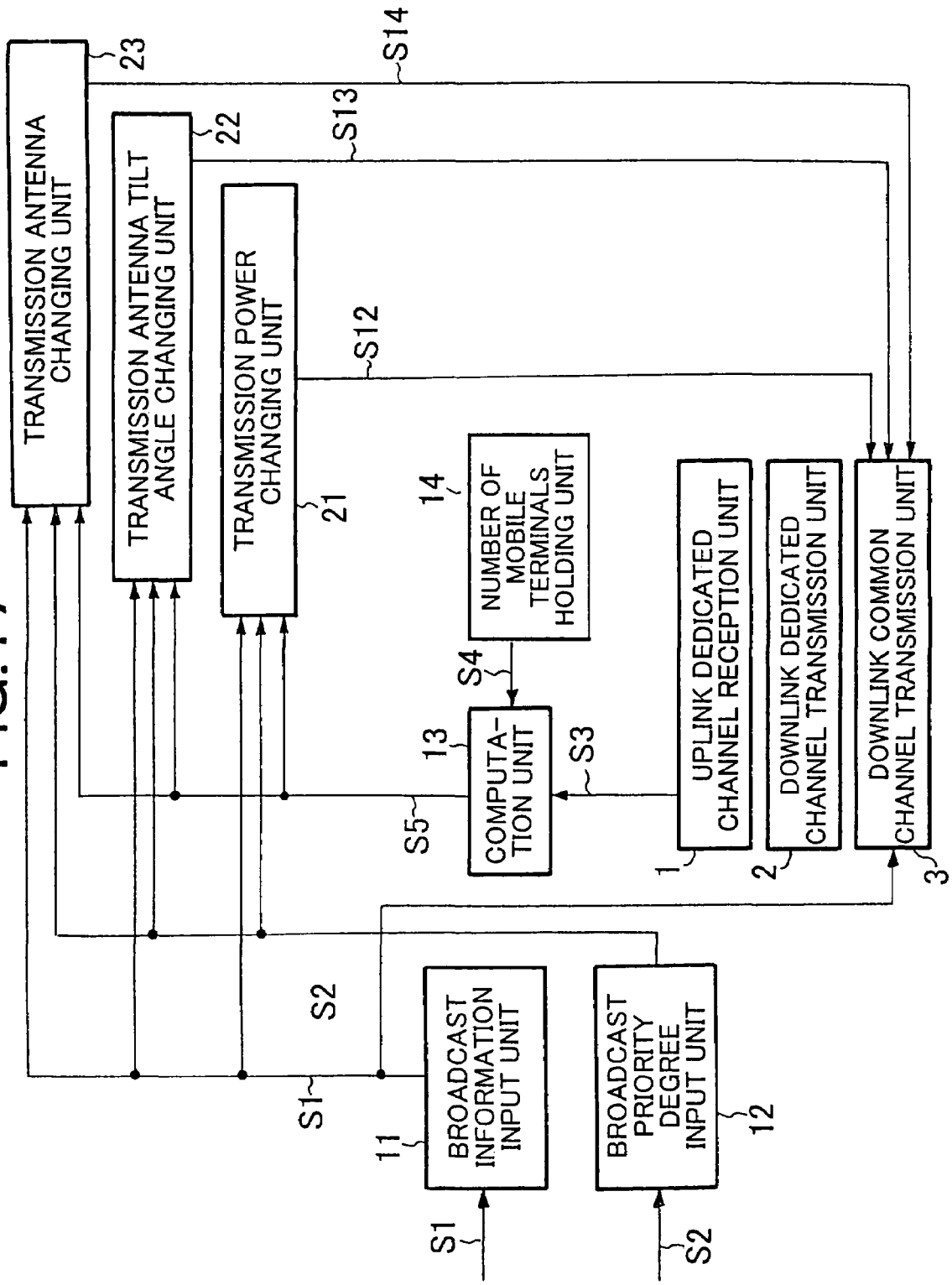
FIG. 17 is a schematic block diagram of a base station of the fifth embodiment of wireless communication network according to the present invention, illustrating the configuration thereof.

FIG. 17 is a schematic block diagram of a base station of the fifth embodiment of wireless communication system according to the present invention, illustrating the internal configuration thereof.

As shown in FIG. 17, this embodiment is realized by adding a unit 23 for replacing the transmission antenna of the downlink common channel with an adaptive antenna (to be referred to as "transmission antenna changing unit" hereinafter) to each base station having the above-described internal configuration of the fourth embodiment of wireless communication system.

As high priority broadcast information S1 is input, the broadcast information input unit 11 subsequently supplies the high priority broadcast information S1 to the transmission antenna changing unit 23 in addition to its operation that is same as the operation of its counterpart of the above-described fourth embodiment.

As the degree of priority S2 of the high priority broadcast information S1 is input, the broadcast priority degree input unit 12 subsequently supplies the degree of priority S2 of the broadcast information to the transmission antenna changing unit 23 in addition to its operation that is same as the operation of its counterpart of the fourth embodiment.

The computing unit 13 computes the ratio S5 of the acknowledgements of the broadcast deliveries and subsequently supplies the ratio S5 of the acknowledgements of the broadcast deliveries S5 it has computed to the transmission antenna changing unit 23 in addition to its operation that is same as the operation of its counterpart of the fourth embodiment.

The transmission antenna changing unit 23 determines the method of replacing of the transmission antenna with an adaptive antenna according to the broadcast information S1, the degree of priority S2 of the broadcast information and the ratio S5 of the acknowledgements of the broadcast deliveries supplied to it.

Methods that can be used for replacing the transmission antenna with an adaptive antenna that can be used for this embodiment include methods of controlling the adaptive antenna after the replacement, those of specifying the duration of the operation of controlling the adaptive antenna and those of specifying the time of ending the operation of controlling the adaptive antenna. Methods of controlling the adaptive antenna after the replacement include a method of firstly selecting a predetermined high value for the antenna gain of the intra-vertical-plane directivity of the adaptive antenna and then sequentially scanning in the peak direction of the antenna gain from a place remote from the base station to a place near the base station when broadcast information is input. However, it is not necessary to control the intra-vertical-plane directivity for this embodiment and the intra-horizontal-plane directivity may alternatively be controlled. Methods of specifying the duration of the operation of controlling the adaptive antenna and those of specifying the time of ending the operation of controlling the adaptive antenna that can be used for this embodiment are similar to those of the first through third embodiments. Then, the transmission antenna changing unit 23 for replacing the transmission antenna of the downlink common channel with an adaptive antenna supplies the determined method of replacing the transmission antenna with an adaptive antenna to the downlink common channel transmission unit 3.

The transmission antenna changing unit 23 has a configuration similar and equivalent to that of the transmission power changing unit 21 but the control program thereof determines the control value after the replacement, referring to a separate table (as will be described in greater detail hereinafter). Additionally, the transmission antenna changing unit 23 adaptively changes the gain and the direction of the antenna by temporarily changing the phase of the transmission signal to be supplied to each of the elements of the transmission antenna that is formed by a plurality of elements additionally arranged in vertical and horizontal directions.

The operation of a specific control program to be executed by the transmission antenna changing unit 23 will be described below by referring to FIGS. 18 and 19.

FIG. 18 is a table Ta5 for specifying the gain Ga of the adaptive antenna that replaces the transmission antenna and the duration Te of the replacement of the transmission antenna when high priority broadcast information S1 and the degree of priority S2 of the broadcast information are input, shown as an example. In the example of FIG. 18, different values are defined for the gain Ga of the adaptive antenna and the duration Tc of the replacement of the transmission antenna by the adaptive antenna to correspond to levels 0 through 3 of the degree of priority S2 of the broadcast information (level 0:ordinary broadcast information, level 1: advertisement information, level 2: emergency information, level 3: emergency information). The defined values of the gain Ga of the adaptive antenna after a replacement include level 0: not specified, level 1: 13 dB, level 2: 16 dB, level 3: 20 dB while the defined values of the duration Tc of the replacement by the adaptive antenna include level 0: not specified, level 1: Tb×2, level 2: Tb×4, level 3; Tb×8. In FIG. 18, Tb corresponds to the duration Tb of a power shift in the above-described Table Ta2 in FIG. 3.

FIG. 19 is a flowchart of the operation of the control program of the transmission antenna changing unit of this embodiment.

Referring to FIG. 19, the transmission antenna changing unit 23 firstly inputs high priority broadcast information S1 and the degree of priority S2 of the broadcast information respectively from the broadcast information input unit 11 and the broadcast priority degree input unit 12 (Step St51). It is assumed here that level of the broadcast information S is 2 (emergency information) and the amount of information of the broadcast information S1 is 35 KB.

Then, the transmission antenna changing unit 23 decides the gain Ga of the adaptive antenna according to the level of the broadcast priority degree S2, referring to the table Ta5 shown in FIG. 18 (Step St52). In the example of FIG. 18, the gain Ga of the adaptive antenna is decided to be 16 dB when the level of the degree of priority S2 of the broadcast information is 2.

Thereafter, the transmission antenna changing unit 23 decides the duration Te of the replacement according to the amount of information of the broadcast information S and the level of the degree of priority S2 of the broadcast information, referring to the table Ta2 shown in FIG. 3 and the table Ta5 shown in FIG. 18 (Step St53). In the examples of FIGS. 3 and 18, the duration Te of the replacement is decided to be Tb×4=6×4=24 seconds when the amount of information of the broadcast information S1 is 35 KB and the level of the degree of priority of the broadcast information is 2.

Then, the transmission antenna changing unit 23 supplies a change control signal S14 of the control values for the decided gain Ga (16 dB) of the adaptive antenna and the duration Te of the replacement (24 seconds) to the downlink common channel transmission unit 3 (Step St54). Note that the control values are the respective differences from the ordinary values. However, not a control operation using the differences but a switching control operation may be used for the purpose of this embodiment.

As a result, the downlink common channel transmission unit 3 replaces the transmission antenna of the downlink common channel with the adaptive antenna by means of the change control signal S14 of the control value supplied to it for controlling the replacement of the transmission antenna with the adaptive antenna. Then, the downlink common channel transmission unit 3 repeatedly transmits the broadcast information S1 supplied to it by means of the common channel signal that all the mobile terminals in the coverage of the downlink receive for the time period of Te, during which the transmission antenna of the downlink common channel is replaced by the adaptive antenna.

FIG. 20 is a schematic illustration of the effective radiation power of a base station in a vertical plane of the transmission power of the downlink common channel from the base station when the transmission antenna of the base station is replaced by an adaptive antenna.

Referring to FIG. 20, the effective radiation power before the transmission antenna is replaced by an adaptive antenna in the base station 106 is indicated by a dotted line, whereas the effective radiation power after the transmission antenna is replaced by an adaptive antenna in the base station 106 is indicated by solid line. As a result of the replacement with the adaptive antenna, while mobile terminal 209 can receive the downlink common channel but mobile terminal 210 cannot receive the downlink common channel before the replacement, the reception power level of the mobile terminal 210 is boosted so that the mobile terminal 210 can receive the downlink common channel after the replacement of the transmission antenna with the adaptive antenna. The reception power level of the mobile terminal 210 is boosted because the effective radiation power is increased in the angle of the direction from the base station 106 to the mobile terminal 208 by the use of the adaptive antenna although the propagation loss between the base station 106 and the mobile terminal 210 is not changed.

On the other hand, however, while the reception power level of the mobile terminal 210 is boosted by the use of the adaptive antenna, the effective radiation power from the base station 106 to the mobile terminal 209 falls as a result of the use of the adaptive antenna. Thus, the reception power level of the mobile terminal 209 is reduced. However, the reception power level of the mobile terminal 209 is also raised by scanning in the peak direction of the antenna gain of the intra-vertical-plane directivity of the adaptive antenna sequentially from a remote point to a near point relative to the base station. As a result, while a delay arises due to the scanning in the peak direction of the antenna gain, it is possible to reliably deliver the broadcast information to both of the mobile terminals 209 and 210.

Therefore, this embodiment provides an advantage that it can reliably deliver the broadcast information to a mobile terminal located deep in a building remote from the base station that shows a large propagation loss and a mobile terminal located at a place far away from the base station, which may be in a scarcely populated area without damaging the deliveries of the broadcast information to mobile terminals located close to the base station.

Sixth Embodiment

Figure 21:
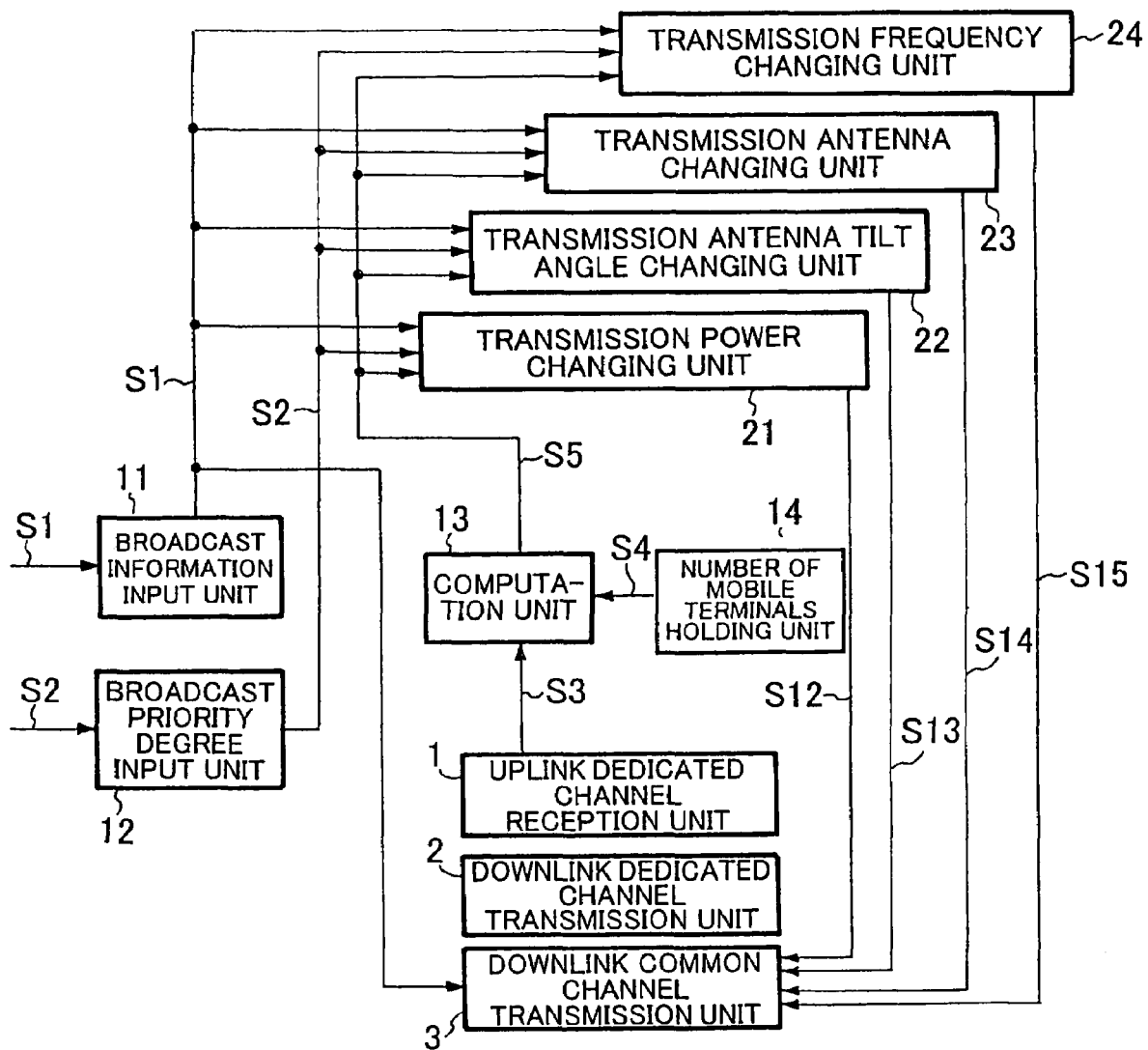
FIG. 21 is schematic block diagram of a base station of the sixth embodiment of wireless communication network according to the present invention, illustrating the configuration thereof.

FIG. 21 is a schematic block diagram of a base station of the sixth embodiment of wireless communication system according to the present invention, illustrating the internal configuration thereof.

As shown in FIG. 21, this embodiment is realized by adding a unit 24 for changing the transmission frequency of the downlink common channel (to be referred to as "transmission frequency changing unit" hereinafter) to each base station having the above-described internal configuration of the fifth embodiment of wireless commounication system.

As high priority broadcast information S1 is input, the broadcast information input unit 11 subsequently supplies the high priority broadcast information S1 to the transmission frequency changing unit 24 in addition to its operation that is same as the operation of its counterpart of the fifth embodiment.

As the degree of priority S2 of the broadcast information of the high priority broadcast information S1 is input, the broadcast priority degree input unit 12 subsequently supplies the degree of priority S2 of the broadcast information to the transmission frequency changing unit 24 in addition to its operation that is same as the operation of its counterpart of the fifth embodiment.

The computing unit 13 computes the ratio S5 of the acknowledgements of the broadcast deliveries and subsequently supplies the ratio S5 of the acknowledgements of the broadcast deliveries it has computed to the transmission frequency changing unit 24 in addition to its operation that is same as the operation of its counterpart of the fifth embodiment.

The transmission frequency changing unit 24 determines the method of changing of the transmission frequency of the downlink common channel according to the broadcast information S1, the degree of priority S2 of the broadcast information and the ratio S5 of the acknowledgements of the broadcast deliveries supplied to it.

Methods that can be used for changing the transmission frequency of the downlink common channel include methods of changing the transmission frequency, those of specifying the duration of the change of transmission frequency and those of specifying the time of ending the change of transmission frequency. Methods of changing the transmission frequency of the downlink common channel include a method of selecting the lowest frequency band for the transmission frequency of the downlink common channel out of the frequency bands that can be used for signal transmission by the wireless communication network when broadcast information is input. Methods of specifying the duration of the change of transmission frequency and those of specifying the time of ending the change of transmission frequency that can be used for this embodiment are similar to those of the third embodiment. Then, the transmission frequency changing unit 24 supplies the determined method of changing the transmission frequency of the downlink common channel to the downlink common channel transmission unit 3.

The transmission frequency changing unit 24 has a configuration similar and equivalent to that of the transmission power changing unit 21 but the control program thereof determines the control value after the change, referring to a separate table (as will be described in greater detail hereinafter). Additionally, the transmission frequency changing unit 24 adaptively changes the transmission frequency by selecting one of the carrier wave frequencies that are prepared in advance.

The operation of a specific control program to be executed by the transmission frequency changing unit 24 will be described below by referring to FIGS. 22 and 23.

FIG. 22 is a table Ta6 to be used for selecting the transmission frequency fa after a change and the durations Tf of the change of transmission power when high priority broadcast information S1 and the degree of priority S2 of the broadcast information are input, shown as an example. In the example of FIG. 22, different values are defined for the transmission frequency fa after a change and the duration Tf of the change of transmission power to correspond to levels 0 through 3 of the degree of priority S2 of the broadcast information (level 0: ordinary broadcast information, level 1: advertisement information, level 2: emergency information, level 3: emergency information). The defined values of the transmission frequency fa include level 0: not specified, level 1: 2 GHz band, level 2: 1.7 GHZ band, level 3: 800 MHz band while the defined values of the duration Tf of the change of transmission power include level 0: not specified, level 1: Tb×2, level 2: Tb×4, level 3: Tb×8. In FIG. 22, Tb corresponds to the duration Tb of a power shift in the above-described Table Ta2 in FIG. 3.

Figure 23:
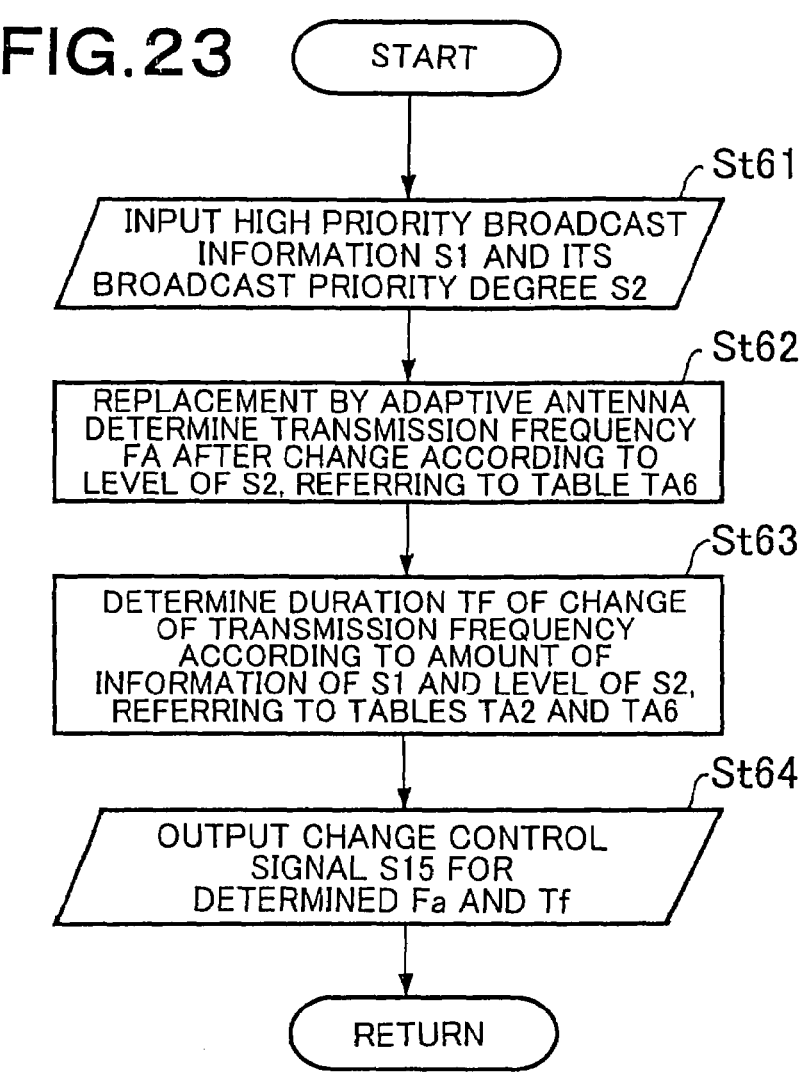
FIG. 23 is a flowchart of the operation of the transmission frequency changing unit of FIG. 21.

FIG. 23 is a flowchart of the operation of the control program of the transmission frequency changing unit of this embodiment.

Referring to FIG. 23, the transmission frequency changing unit 24 firstly inputs high priority broadcast information S1 and the degree of priority S2 of the broadcast information respectively from the broadcast information input unit 11 and the broadcast priority degree input unit 12 (Step St61). It is assumed here that level of the broadcast information S1 is 2 (emergency information) and the amount of information of the broadcast information S1 is 35 KB.

Then, the transmission frequency changing unit 24 decides the transmission frequency fa after the change according to the level of the broadcast priority degree S2, referring to the table Ta6 shown in FIG. 22 (Step St62). In the example of FIG. 22, the transmission frequency fa after a change is decided to be 1.7 GHz band when the level of the degree of priority S2 of the broadcast information is 2.

Thereafter, the transmission frequency changing unit 24 decides the duration Tf of the change according to the amount of information of the broadcast information S1 and the level of the degree of priority S2 of the broadcast information, referring to the table Ta2 shown in FIG. 3 and the table Ta6 shown in FIG. 22 (Step St63). In the examples of FIGS. 3 and 22, the duration Tf of the change is decided to be Tb×4=6× 4=24 seconds when the amount of information of the broadcast information S1 is 35 KB and the level of the degree of priority S2 of the broadcast information is 2.

Then, the transmission frequency changing unit 24 supplies a change control signal S15 of the control values for the transmission frequency fa (1.7 GHz band) and the duration Tf of the change (24 seconds) to the downlink common channel transmission unit 3 (Step St64). Note that the control values are the respective differences from the ordinary values. However, not a control operation using the differences but a switching control operation may be used for the purpose of this embodiment.

As a result, the downlink common channel transmission unit 3 changes the transmission frequency of the downlink common channel by means of the change control signal S15 of the control value supplied to it for controlling the method of changing the transmission frequency of the downlink common channel. Then, the downlink common channel transmission unit 3 repeatedly transmits the broadcast information S1 supplied to it by means of the common channel signal that all the mobile terminals in the coverage of the downlink receive for the time period during which the transmission frequency of the downlink common channel is changed.

Figure 24:
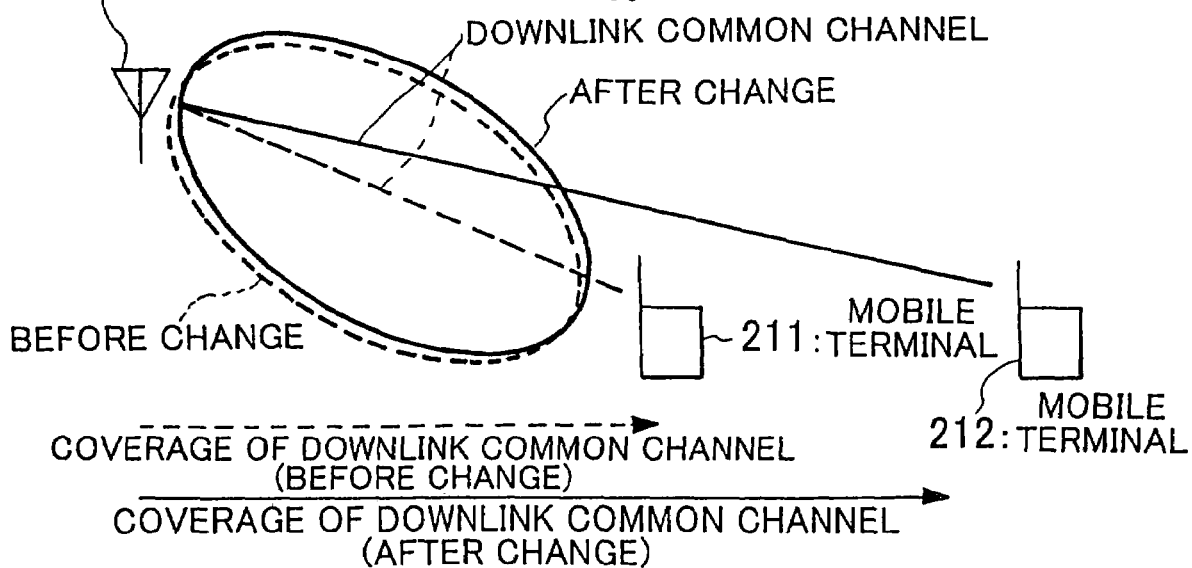
FIG. 24 is a schematic illustration of the effective radiation power and the coverage of a base station when the transmission frequency of the base station is changed.

FIG. 24 is a schematic illustration of the effective radiation power of a base station in a vertical plane of the transmission power of the downlink common channel from the base station when the transmission frequency is changed.

Referring to FIG. 24, the effective radiation power before the transmission frequency is changed in the base station 107 is indicated by a dotted line, whereas the effective radiation power after the transmission frequency is changed in the base station 107 is indicated by solid line. As shown in FIG. 24, no difference of effective radiation power arises between before the change of the transmission frequency and after the change of the transmission frequency.

However, if mobile terminal 211 found in the coverage before the change of transmission frequency can receive the downlink common channel but mobile terminal 212 cannot receive the downlink common channel, the coverage of the downlink common channel is expanded and the reception power level of the mobile terminal 212 is boosted after the change of the transmission frequency so that the mobile terminal 212 can receive the broadcast information of the downlink common channel after the change.

The reception power level of the mobile terminal 212 is boosted because the propagation loss between the base station 107 and mobile terminal 212 is reduced while the effective radiation power is not changed in the angle of the direction from the base station 107 to the mobile terminal 212. Generally, an electric wave shows a small propagation loss when the frequency is low. Therefore, the description that the propagation loss is reduced as a result of the change of transmission frequency to a low frequency and rise of the signal reception level of a mobile terminal is generally applicable not only to the mobile terminal 212 but also to any mobile terminals.

Therefore, this embodiment provides an advantage that it can reliably deliver the broadcast information to a mobile terminal located deep in a building remote from the base station that shows a large propagation loss and a mobile terminal located at a place far away from the base station, which may be in a scarcely populated area.

Seventh Embodiment

Figure 25:
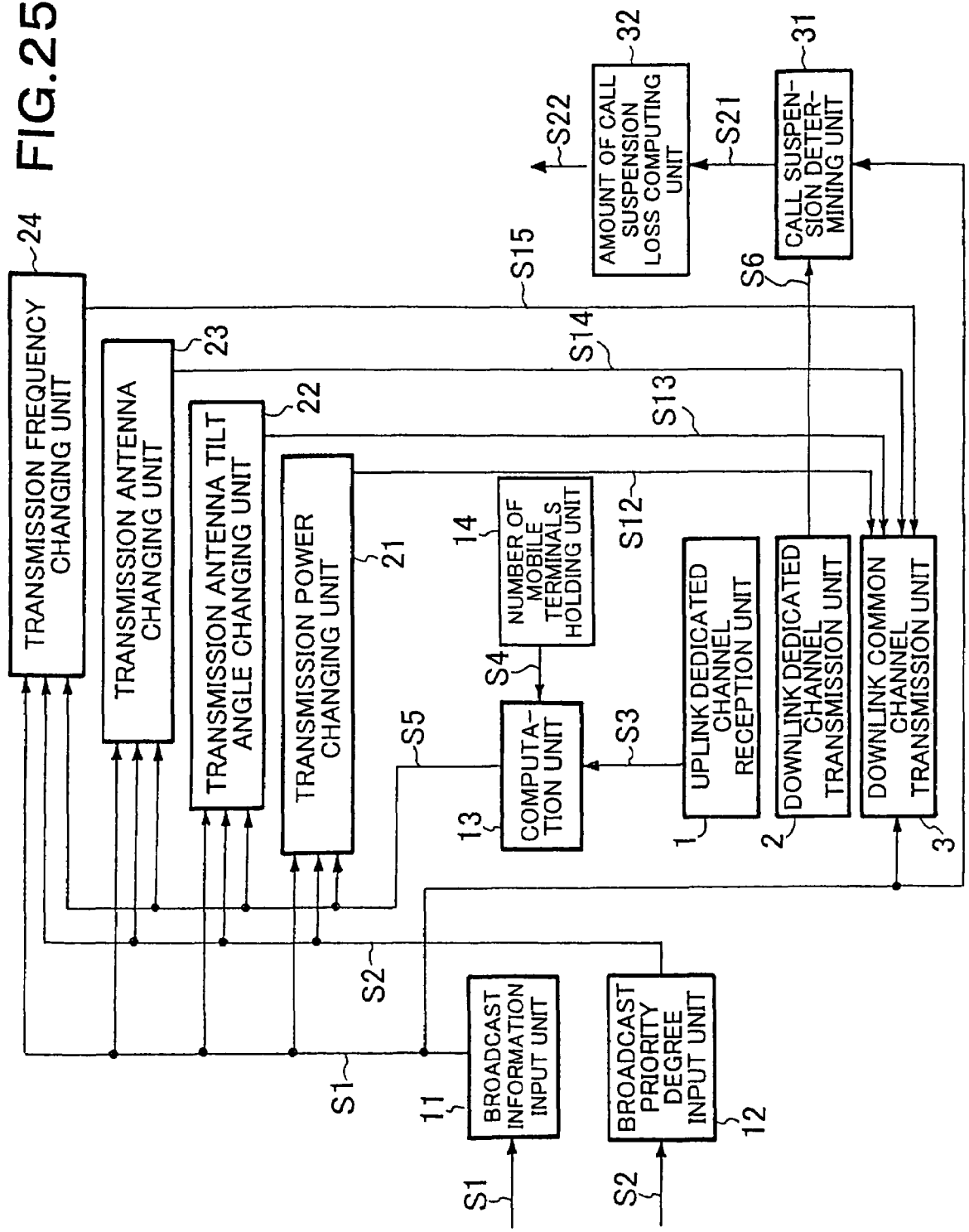
FIG. 25 is a schematic block diagram of a base station of the seventh embodiment of wireless communication network according to the present invention, illustrating the configuration thereof.

FIG. 25 is a schematic block diagram of a base station of the seventh embodiment of wireless communication system according to the present invention, illustrating the internal configuration thereof.

As shown in FIG. 25, this embodiment is realized by adding a unit 31 for determining to suspend a call (to be referred to as "call suspension determining unit" hereinafter) and a unit 32 for computing the amount of the loss due to the call suspension (to be referred to as "amount of call suspension loss computing unit" hereinafter) to each base station having the above-described internal configuration of the sixth embodiment of wireless communication system illustrated in FIG. 11.

This embodiment performs an additional operation as described below to the operation of the sixth embodiment.

Upon receiving an input of broadcast information S1, the broadcast information input unit 11 supplies the broadcast information S1 to the call suspension determining unit 31.

The call suspension determining unit 31 detects one or more than one call suspensions by means of downlink dedicated channel transmission status S6 and counts the number of call suspensions S21 immediately after the input of broadcast information S1, using the broadcast information S1 input from the broadcast information input unit 11 and the downlink dedicated channel transmission status S6 supplied from the downlink dedicated channel transmission means 2. The downlink dedicated channel transmission status S6 may typically be time series date on the transmission power of the downlink dedicated channels or the time series data on the number of dedicated channels being used for transmission.

The call suspension determining unit 31 supplies the number of call suspensions S21 it has counted to the amount of call suspension loss computation unit 32.

The amount of call suspension loss computing unit 32 estimates the amount of the loss due to the call suspensions by multiplying the communication charge on the basis of the expected duration of each of the suspended calls or the expected number of packets to be used for each the suspended calls if the call is not suspended by the number of call suspensions S21 and outputs the amount of loss S22 due to the call suspensions.

Thus, with this embodiment, it is possible to estimate the amount of the loss incurred by one or more than one call suspensions that arise on the wireless communication network as a result of the transmission of high priority broadcast information. Then, it is possible to present a reasonable basis for charging the requester of the high priority broadcast information to cover the expenses.

Eighth Embodiment

Figure 26:
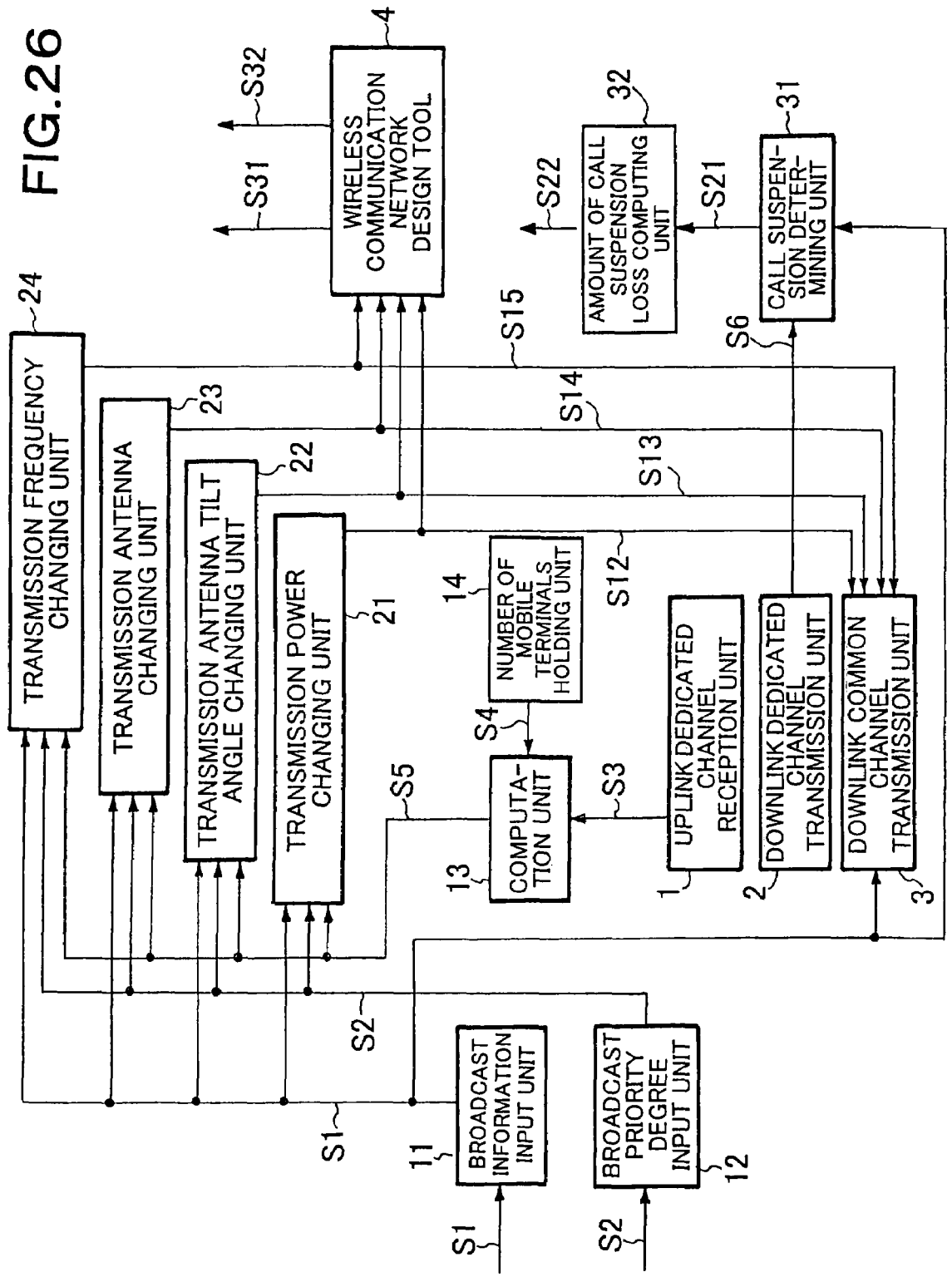
FIG. 26 is a schematic block diagram of a base station of the eighth embodiment of wireless communication network according to the present invention, illustrating the configuration thereof.

FIG. 26 is a schematic block diagram of a base station of the eighth embodiment of wireless communication system according to the present invention, illustrating the internal configuration thereof.

As shown in FIG. 26, this embodiment is realized by adding a wireless communication network design tool 41 for computing and outputting the predicted broadcast information diversity ratio S31 and the predicted amount of loss S32 to each base station having the above-described internal configuration of the seventh embodiment of wireless communication system.

The predicted broadcast information delivery ratio S31 refers to a predicted value indicating the ratio by which the broadcast information is delivered to the mobile terminals that are estimated to be found in the coverage of the base station.

The predicted amount of loss S32 refers to the sum of the amount of the loss attributable to call losses predicted to arise as a result of the transmission of the broadcast information and the amount of the loss attributable to the call suspensions.

This embodiment performs an additional operation as described below to the operation of the seventh embodiment.

The transmission power changing unit 21 supplies the control signal S12 for controlling the selected method of changing the decided transmission power to the wireless communication network design tool 41.

The transmission antenna tilt angle changing unit 22 supplies the change control signal S13 for controlling the selected method of changing the tilt angle of the antenna to the wireless communication network design tool 41.

The transmission antenna changing unit 23 supplies the change control signal S14 for controlling the selected method of replacing the transmission antenna with the adaptive antenna to the wireless communication network design tool 41.

The transmission frequency changing unit 24 supplies the change control signal S15 for controlling the selected method of changing the transmission frequency to the wireless communication network design tool 41.

The wireless communication network design tool 41 simulates a transmission of broadcast information via the downlink common channel, computation of the propagation losses, also simulates an appearance of a mobile terminal and the occurrence of the ordinary traffic to each of the mobile terminals when the broadcast information is not transmitted and the ordinary traffic when broadcast information is transmitted and also computes the predicted broadcast information delivery ratio and the predicted amount of loss according to the change control signals S12, S13, S14 and S15. While general wireless communication network design tools have a functional feature of simulating actual operations of a real wireless communication network and computing and outputting the communication quality of the wireless communication network, the wireless communication network design tool 41 of this embodiment is characterized by having an additional feature of computing and outputting the predicted broadcast information delivery ratio and the predicted amount of loss in addition to the functional feature of general wireless communication network design tools.

The wireless communication network design tool 41 compares the expected traffic with the ordinary traffic when the broadcast information is not transmitted, estimates the amount of loss due to the expected call suspensions that are predicted to take place as a result of the transmission of the broadcast information and also the amount of loss due to call losses and outputs the sum of the two amounts as predicted amount of loss S32.

The wireless communication network design tool 41 estimates by simulation the number of call losses that the base station can hardly observe and computes the amount of loss due to call losses on the basis of the estimated number of call losses so that it is possible to reasonably estimate the amount of loss by means of the operation of the seventh embodiment. The base station can hardly observe call losses because repeated calls and call losses take place at a same mobile terminal when the call loss probability rises and therefore the base station estimates call losses not due to the real traffic but due to such an excessive traffic caused by repeated calls. It is not appropriate to use the number of such excessive call losses that the base station observes for the number of call losses to be used to estimate the amount of loss.

The wireless communication network design tool 41 is mounted in server apparatus outside the base station. It is realized by software to be executed by the CPU of the server apparatus. It is sufficient for the wireless communication network design tool 41 to take in the data on the change or changes made to the wireless communication network from the base station regardless if it is connected to the network or not.

Figure 27:
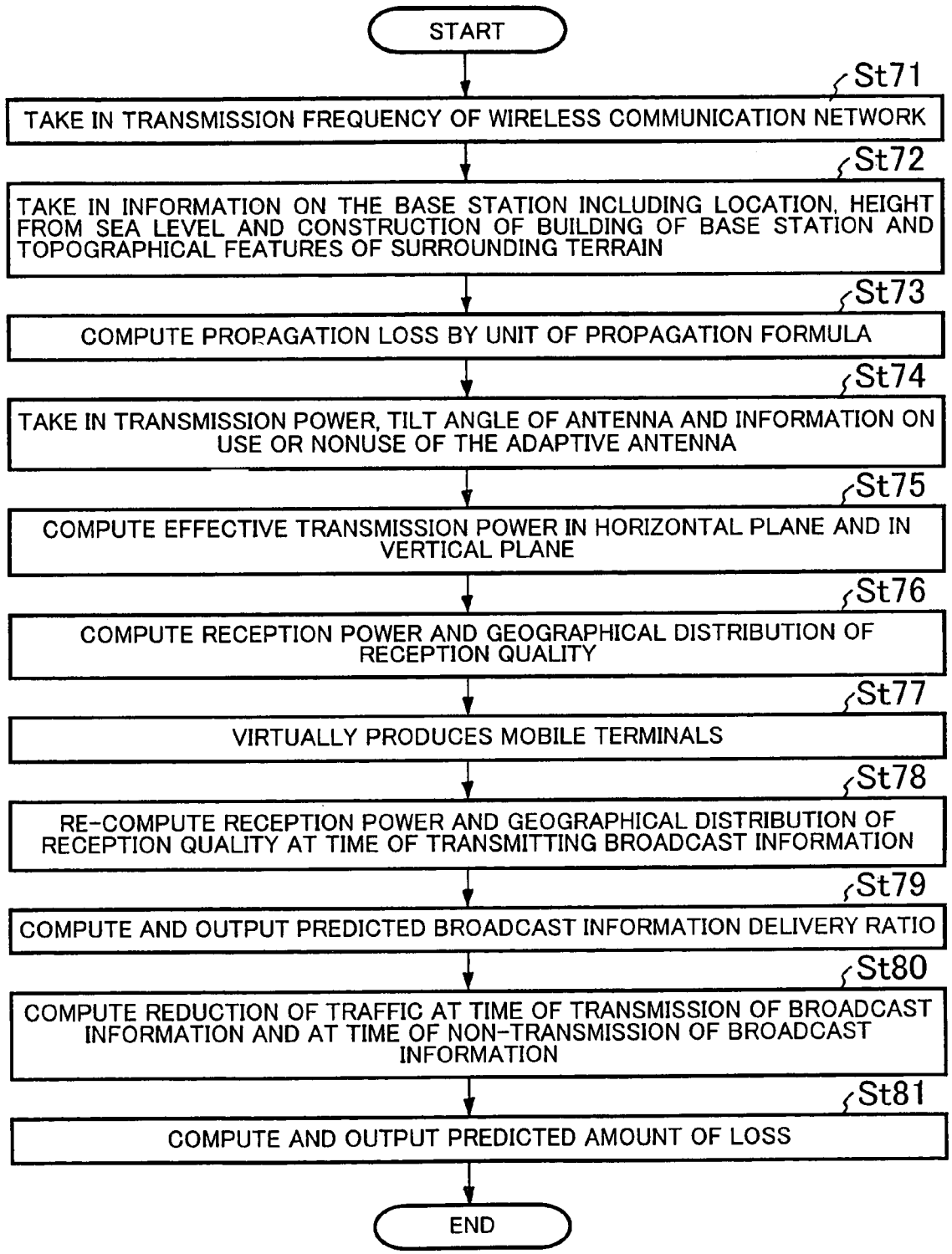
FIG. 27 is a flowchart of the operation of the wireless communication network design tool of FIG. 26.
Figure 28:
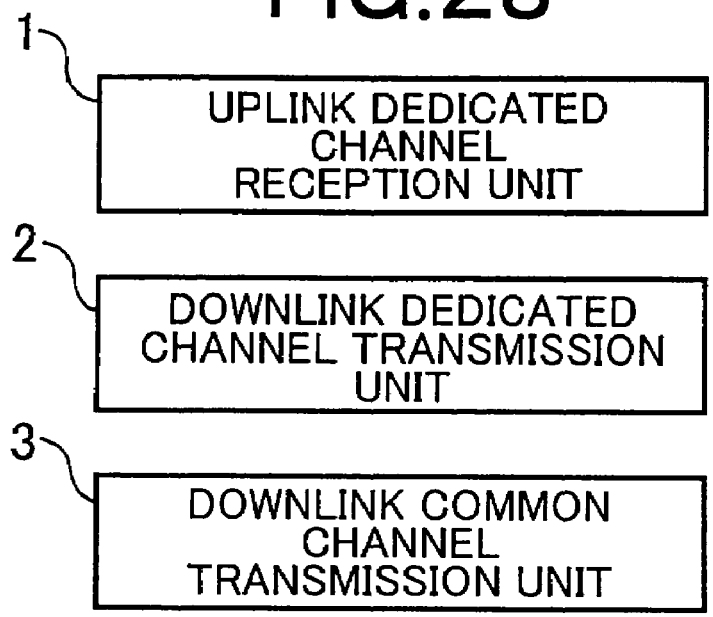
FIG. 28 is a schematic block diagram of a known wireless communication network.
Figure 29:
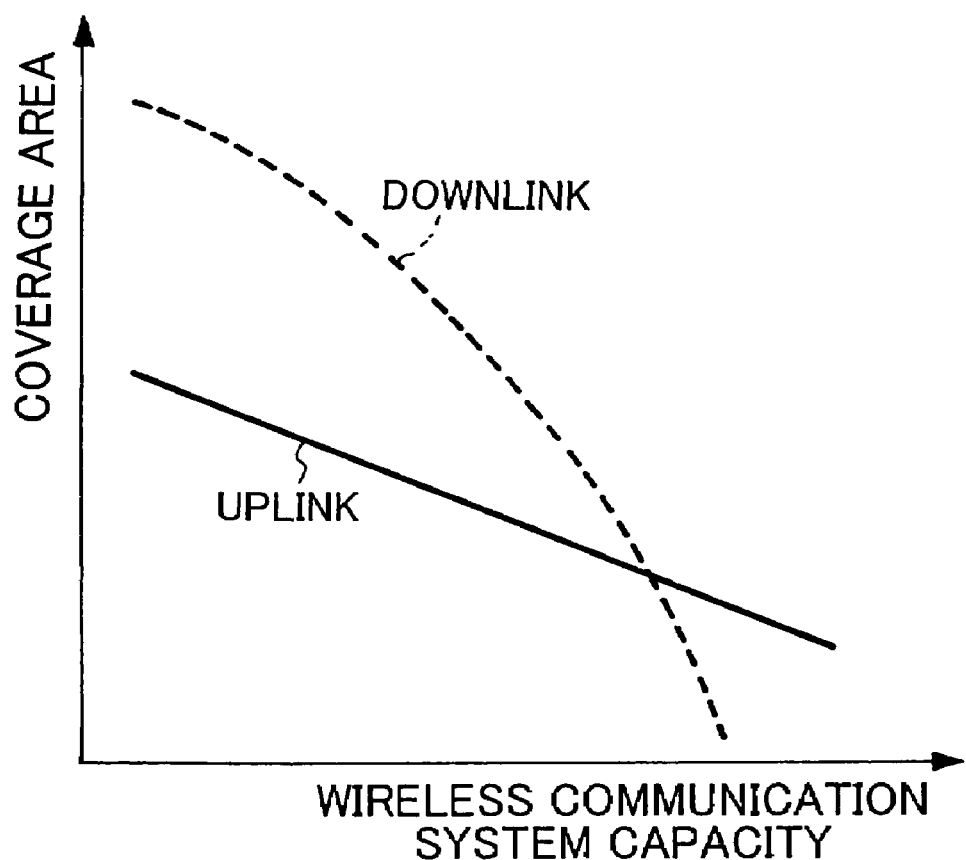
FIG. 29 is a graph illustrating the relationship between the coverage and the system capacity of a wireless communication network.

FIG. 27 is a flowchart of the operation of the wireless communication network design tool 41.

Referring to FIG. 27, firstly, the wireless communication network design tool 41 takes in the transmission frequency of the wireless communication network as input value (Step St71) and also information on the base station that is equipped with an antenna including the location, the height from the sea level and the construction of the building of the base station and the topographical features of the surrounding terrain (Step St72). Thereafter, the wireless communication network design tool 41 computationally determines the propagation loss from the antenna to all the points in the coverage based on the information by means of a predetermined propagation formula (Step St73).

Then, the wireless communication network design tool 41 takes in the transmission power and the tilt angle of the antenna and information on the use or nonuse of the adaptive antenna as input values (Step St74) and computationally determines the effective transmission power in a horizontal plane and also in a vertical plane (Step St75). Subsequently, the wireless communication network design tool 41 computationally determines the reception power at a predetermined point when the effective transmission power from the antenna is received at the point and also the geographical distribution of the reception quality that is expressed by the S/N (signal to noise ratio) and the SIR (signal to interference noise ratio) (Step St76).

Additionally, the wireless communication network design tool 41 virtually produces mobile terminals (Step St77) and re-computes the reception power and the geographical distribution of the reception quality at each and every point to which the broadcast information S1 is transmitted (Step St78). Then, it computes and outputs the predicted broadcast information delivery ratio S33 to the mobile terminals on the basis of the re-computed reception power and the geographical distribution of the reception quality (Step St79).

Thereafter, the wireless communication network design tool 41 computes the reduction in the upward and downward traffics to the mobile terminals when the broadcast information is transmitted from those when the broadcast information is not transmitted (Step St80) and then computes and outputs the predicted amount of loss S32 according to the computed reduction in the traffics (Step St81).

Thus, with this embodiment, it is possible to estimate the amount of loss that is incurred by the transmission of high priority broadcast information by estimating not only the call suspensions that are expected to take place in the wireless communication system but also the call loss probability. Therefore, it is possible to present a reasonable basis for charging the requester of the high priority broadcast information to cover the expenses.

The advantages of the first through eighth embodiments are listed below.

1) When broadcast information is input, the effective radiation power and the reception level of a mobile terminal located at a place with a large propagation loss are raised by changing the transmission power of the downlink common channel and the tilt angle of the antenna and replacing the transmission antenna with the adaptive antenna.

2) The propagation loss is reduced and the reception level of a mobile terminal located at a place of a large propagation loss is raised by changing the transmission frequency of the downlink common channel when broadcast information is input.

3) Since the post-change transmission power and the post-change tilt angle of the antenna are determined according to the high priority broadcast information, the effective radiation power to a mobile terminal located remote from the base station and hence the reception level of the mobile terminal located at a place of a large propagation loss are raised when the priority of the broadcast information is high.

4) The duration of the change of the transmission power and so on is determined in proportion to the priority of the broadcast information. Therefore, a long duration is selected for the change and the broadcast information is transmitted repeatedly during the time period of the change so that the broadcast information can be delivered to mobile terminals with a high probability when a high priority broadcast information is input.

5) The change is ended when the ratio of the acknowledgements from mobile terminals gets to a predetermined level. In other words, the change is ended when the broadcast information is delivered to mobile terminals at or above a predetermined delivery level. Thus, the transmission of the broadcast information is repeated until the broadcast information is delivered to get to a satisfactory delivery level and hence the broadcast information is highly probably delivered to each mobile terminal.

6) When broadcast information is input, the call suspension detection unit counts the number of call suspensions attributable to the transmission of the broadcast information and computes the amount of loss incurred by the call suspensions on the basis of the number of call suspensions. Therefore, it is possible to present a reasonable basis for charging to cover the expenses.

7) When broadcast information is input, the wireless communication network design tool computes the predicted broadcast information delivery ratio and the predicted amount of loss. The predicted amount of loss includes not only the amount of loss due to the expected call suspensions but also the amount of loss due to the estimated call losses determined by comparing with the ordinary traffic where the broadcast information is not transmitted. Therefore, again, it is possible to present a reasonable basis for charging to cover the expenses.

Thus, in short, the present invention provides an advantage of being able to reliably deliver high priority broadcast information from a base station to mobile terminals located at places where the propagation loss is large, or places such as those located deep in building and those located in scarcely populated areas that are remote from base stations. The present invention also provides an advantage of being able to estimate the amount of loss incurred to the wireless communication system as a result of the transmission of high priority broadcast information and present a reasonable basis for charging the requester of the high priority broadcast information to cover the expenses.

It may be clear to those skilled in the art that the present invention is by no unit limited to the above-described embodiments that are illustrated as typical examples, which may be modified and/or altered in various different ways without departing from the spirit and scope of the present invention as defined in the appended claims. For example, while the wireless communication system of any of the above-described embodiments is controlled by a computer program, it may alternatively controlled by means of hardware or a combination of software and hardware so long as the functional features as defined in the appended claims can be realized. For example, some other logic circuit or circuits may be used to realize part or all of the above-described program control.

As described above in detail, the present invention can find applications in wireless communication networks adapted to transmit broadcast information using downlink common channels in addition to transmissions using downlink dedicated channels and receptions using uplink dedicated channels.

What is claimed is:

1. A wireless communication network having a plurality of base stations for forming a cellular system for wireless communications with a plurality of mobile terminals via uplinks and downlinks, said wireless communication network comprising:
    a downlink dedicated channel transmission unit configured to individually transmit communication data from the plurality of base stations to the plurality of mobile terminals using downlink dedicated channels of the cellular system;
    an uplink dedicated channel reception unit configured to individually receive communication data from the plurality of mobile terminals using uplink dedicated channels of the cellular system;
    a downlink common channel transmission unit configured to transmit broadcast information from the plurality of base stations to the plurality of mobile terminals using the downlink common channels of the cellular system;
    a broadcast information input unit configured to input high priority broadcast information as the broadcast information; and
    a transmission method changing unit configured to change the transmission method of the downlink common channels used by the downlink common channel transmission unit so as to make effective radiation power of the downlink common channels of the base stations large at places in the coverage of each of the base stations subjected to propagation loss when the high priority broadcast information is input.

2. The wireless communication network according to claim 1, wherein
    said transmission method changing unit has a unit configured to set the duration of the change of the transmission method based on an amount of information of the high priority broadcast information.

3. The wireless communication network according to claim 1, further comprising:
    a broadcast priority degree input unit configured to input a degree of priority of the broadcast information,
    wherein said transmission method changing unit has a unit configured to change the transmission method of the downlink common channel according to the level of the degree of priority of the broadcast information.

4. The wireless communication network according to claim 1, further comprising:
    a computation unit configured to compute a ratio of the number of acknowledgements for the deliveries of the broadcast information from the mobile terminals received by the uplink dedicated channels relative to the number of mobile terminals expected to be found in the coverage,
    wherein said transmission method changing unit has a unit configured to change the transmission method of the downlink common channel according to the ratio computed by the computation unit.

5. The wireless communication network according to claim 1, wherein
    said transmission method changing unit has a unit configured to change a transmission power of each of the base stations as the transmission method.

6. The wireless communication network according to claim 1, wherein
    said transmission method changing unit has a unit configured to change a tilt angle of a transmission antenna each of the base stations as the transmission method.

7. The wireless communication network according to claim 1, wherein
    said transmission method changing unit has a unit configured to replace a transmission antenna with an adaptive antenna of each of the base stations as the transmission method.

8. The wireless communication network according to claim 1, wherein
    said transmission method changing unit has a unit configured to change a transmission frequency of each of the base stations as the transmission method.

9. The wireless communication network according to claim 1, further comprising:
    a call suspension detection unit configured to detect the call suspensions arising in the wireless communication network as a result of the change of transmission method of the downlink common channel changed by the transmission method changing unit and counting the number of the call suspensions; and
    an amount of loss computation unit configured to compute an amount of loss on the basis of the number of call suspensions arising in the wireless communication network.

10. The wireless communication network according to claim 1, further comprising:
    a unit configured to compute a predicted broadcast information delivery ratio showing a ratio of the mobile terminals in the coverage expected to complete the reception of the broadcast delivery according to the change of the transmission method of the downlink common channel and a predicted amount of loss according to the number of call suspensions and the number of call losses predicted to take place in the wireless communication network as a result of the change of the transmission method.

11. A wireless communication network design tool to be used by a wireless communication network according to claim 1, the tool comprising:
    a unit configured to compute a predicted broadcast information delivery ratio showing a ratio of the mobile terminals in the coverage expected to complete the reception of the broadcast delivery according to the change of the transmission method of the downlink common channel and a predicted amount of loss according to the number of call suspensions and the number of call losses predicted to take place in the wireless communication network as a result of the change of the transmission method.

12. A method of broadcasting high priority information of wireless communication network having a plurality of base stations for forming a cellular system for wireless communications with a plurality of mobile terminals via uplinks and downlinks, said wireless communication network comprising:
    a downlink dedicated channel transmission unit configured to individually transmit communication data from the plurality of base stations to the plurality of mobile terminals using downlink dedicated channels of the cellular system;

an uplink dedicated channel reception unit configured to individually receive communication data from the plurality of mobile terminals using uplink dedicated channels of the cellular system;

a downlink common channel transmission unit configured to transmit broadcast information from the plurality of base stations to the plurality of mobile terminals using the downlink common channels of the cellular system, said method comprising:

a step of inputting high priority broadcast information as the broadcast information; and a step of changing the transmission method of the downlink common channels used by the downlink common channel transmission unit so as to make effective radiation power of the downlink common channels of the base stations large at places in the coverage of each of the base stations subjected to propagation loss when the high priority broadcast information is input.

13. The method according to claim 12, wherein said step of inputting has a step of setting the duration of the change of the transmission method based on an amount of information of the high priority broadcast information.

14. The method according to claim 12, further comprising:
a step of a inputting a degree of priority of the broadcast information,
wherein said step of changing has a step of changing the transmission method of the downlink common channel according to the level of the degree of priority of the broadcast information.

15. The method according to claim 12, further comprising:
a step of computing a ratio of the number of acknowledgements for the deliveries of the broadcast information from the mobile terminals received by the uplink dedicated channels relative to the number of mobile terminals expected to be found in the coverage,
wherein said step of changing has a step of changing the transmission method of the downlink common channel according to the ratio computed by the computation unit.

16. The method according to claim 12, wherein said step of changing has a step of changing a transmission power of each of the base stations as the transmission method.

17. The method according to claim 12, wherein said step of changing has a step of changing a tilt angle of a transmission antenna each of the base stations as the transmission method.

18. The method according to claim 12, wherein said step of changing has a step of replacing a transmission antenna with an adaptive antenna of each of the base stations as the transmission method.

19. The method according to claim 12, wherein said step of changing has a step of changing a transmission frequency of each of the base stations as the transmission method.

20. The method according to claim 12, further comprising:
a step of detecting the call suspensions arising in the wireless communication network as a result of the change of transmission method of the downlink common channel changed by the transmission method changing unit and counting the number of the call suspensions; and
a step of computing an amount of loss on the basis of the number of call suspensions arising in the wireless communication network.

21. The method according to claim 12, further comprising:
a step of computing a predicted broadcast information delivery ratio showing a ratio of the mobile terminals in the coverage expected to complete the reception of the broadcast delivery according to the change of the transmission method of the downlink common channel and a predicted amount of loss according to the number of call suspensions and the number of call losses predicted to take place in the wireless communication network as a result of the change of the transmission method.

22. A base station in a cellular system for wireless communications with a plurality of mobile terminals via uplinks and downlinks, said base station comprising:
a downlink dedicated channel transmission unit configured to transmit communication data to the plurality of mobile terminals using downlink dedicated channels of the cellular system;
an uplink dedicated channel reception unit configured to receive communication data from the plurality of mobile terminals using uplink dedicated channels of the cellular system;
a downlink common channel transmission unit configured to transmit broadcast information to the plurality of mobile terminals using the downlink common channels of the cellular system;
a broadcast information input unit configured to input high priority broadcast information as the broadcast information; and
a transmission method changing unit configured to change the transmission method of the downlink common channels used by the downlink common channel transmission unit so as to make effective radiation power of the downlink common channels of the base stations large at places in the coverage of each of the base stations subjected to propagation loss when the high priority broadcast information is input.

* * * * *